United States Patent
Angood et al.

(10) Patent No.: US 8,368,887 B2
(45) Date of Patent: Feb. 5, 2013

(54) ROTATION DETECTION KIT

(75) Inventors: Stephen Mark Angood, Witney (GB);
Christopher Kemp, Wotton-under-Edge (GB); Raymond John Chaney, Berkeley (GB); Mark Adrian Vincent Chapman, Wotton-under-Edge (GB); David Roberts McMurtry, Dursley (GB)

(73) Assignee: Renishaw PLC, Wotton-under-edge (GB)

( * ) Notice: Subject to any disclaimer, the term of this patent is extended or adjusted under 35 U.S.C. 154(b) by 469 days.

(21) Appl. No.: 12/450,742

(22) PCT Filed: Sep. 4, 2008

(86) PCT No.: PCT/GB2008/001254
§ 371 (c)(1),
(2), (4) Date: Oct. 9, 2009

(87) PCT Pub. No.: WO2008/122808
PCT Pub. Date: Oct. 16, 2008

(65) Prior Publication Data
US 2010/0053615 A1    Mar. 4, 2010

(30) Foreign Application Priority Data
Apr. 10, 2007 (GB) .................................. 0706821.6

(51) Int. Cl.
*G01J 4/00* (2006.01)
(52) U.S. Cl. ........................................ 356/364; 356/367
(58) Field of Classification Search .................. 356/364, 356/367; 250/559.09
See application file for complete search history.

(56) References Cited

U.S. PATENT DOCUMENTS

| 3,306,159 A | 2/1967 | Beall, Jr. et al. |
| 3,336,832 A | 8/1967 | Snavely |
| 3,474,255 A | 10/1969 | White |
| 3,552,859 A | 1/1971 | Snyder, III |
| 3,604,811 A | 9/1971 | McMenmin |

(Continued)

FOREIGN PATENT DOCUMENTS

| DE | 34 05 886 A1 | 8/1985 |
| DE | 38 03 853 A1 | 8/1989 |

(Continued)

OTHER PUBLICATIONS

Jiang, H. et al., "Sensitivity enhanced roll angle measurement," Optical Engineering, vol. 39, No. 2, pp. 516-519, Feb. 2000.

(Continued)

*Primary Examiner* — Roy M Punnoose
(74) *Attorney, Agent, or Firm* — Oliff & Berridge, PLC

(57) ABSTRACT

A rotation detection kit, comprising: a beam source; a receiver comprising at least one beam intensity sensor; a polarizer device for location in the path of a beam emitted from the beam source and received by the beam sensor; and a modulator. The modulator is configured to modulate at least one of i) the beam source and ii) a beam emitted by the beam source to create a discretely varying polarization orientation thereby defining first and at least second temporally spaced beam portions. The temporally spaced beam portions are incident on the polarizer device and the beam sensor and have substantially identical profiles and at least an initial common propagation axis toward the polarizer device.

27 Claims, 7 Drawing Sheets

U.S. PATENT DOCUMENTS

| | | | |
|---|---|---|---|
| 3,723,013 | A | 3/1973 | Stirland et al. |
| 3,871,771 | A | 3/1975 | Scott |
| 3,932,039 | A | 1/1976 | Frey |
| 3,938,890 | A | 2/1976 | Flavell |
| 4,695,796 | A | 9/1987 | Omet et al. |
| 4,792,228 | A | 12/1988 | Haffner |
| 4,863,274 | A | 9/1989 | Spillman, Jr. et al. |
| 4,958,929 | A | 9/1990 | Kondo |
| 5,021,647 | A | 6/1991 | Tatsuno et al. |
| 5,073,025 | A * | 12/1991 | Brooks .......... 356/367 |
| 5,102,222 | A | 4/1992 | Berger et al. |
| 5,333,053 | A | 7/1994 | Ishida |
| 5,408,318 | A | 4/1995 | Slater |
| 5,596,403 | A | 1/1997 | Schiff et al. |
| 5,815,269 | A | 9/1998 | Crabb et al. |
| 5,900,938 | A * | 5/1999 | Huang .......... 356/508 |
| 6,031,613 | A | 2/2000 | Washington |
| 6,049,377 | A | 4/2000 | Lau et al. |
| 7,027,162 | B2 | 4/2006 | Lau et al. |
| 7,230,689 | B2 * | 6/2007 | Lau .......... 356/73 |
| 7,352,446 | B2 | 4/2008 | Bridges et al. |
| 2003/0043362 | A1 | 3/2003 | Lau |
| 2003/0106228 | A1 | 6/2003 | Fujishima |
| 2004/0200947 | A1 | 10/2004 | Lau |
| 2007/0057668 | A1 | 3/2007 | Lee et al. |

FOREIGN PATENT DOCUMENTS

| | | |
|---|---|---|
| EP | 0 345 093 A2 | 12/1989 |
| EP | 0 468 487 A2 | 1/1992 |
| EP | 0 936 445 B1 | 7/2006 |
| GB | 1 428 372 | 3/1976 |
| GB | 1 453 728 | 10/1976 |
| GB | 2 389 896 A | 12/2003 |
| JP | A-2003-156319 | 5/2003 |
| WO | WO 92/21933 A1 | 12/1992 |
| WO | WO 98/07012 A1 | 2/1998 |
| WO | WO 02/04890 A1 | 1/2002 |
| WO | WO 03/019231 A1 | 3/2003 |
| WO | WO 03/083411 A1 | 10/2003 |
| WO | WO 2004/102225 A2 | 11/2004 |
| WO | WO 2008/122814 A2 | 10/2008 |
| WO | WO 2008/122816 A1 | 10/2008 |

OTHER PUBLICATIONS

Ingensand, H. et al., "A High-Accuracy Alignment System Based on the Dispersion Effect," Proceedings of the $5^{th}$ International Workshop on Accelerator Alignment, Oct. 13-17, 1997.

Ingensand, H., "Concepts and Solutions to Overcome the Refraction Problem in Terrestrial Precision Measurement," Session JS28 Integration of Techniques and Corrections to Achieve Accurate Engineering Survey; Fig XXII International Congress, Washington, D.C USA, Apr. 19-26, 2002.

Ikeda, K. et al., "Endless Tracking Polarization Controller," Furukawa Review, No. 23, pp. 32-38, 2003.

\* cited by examiner

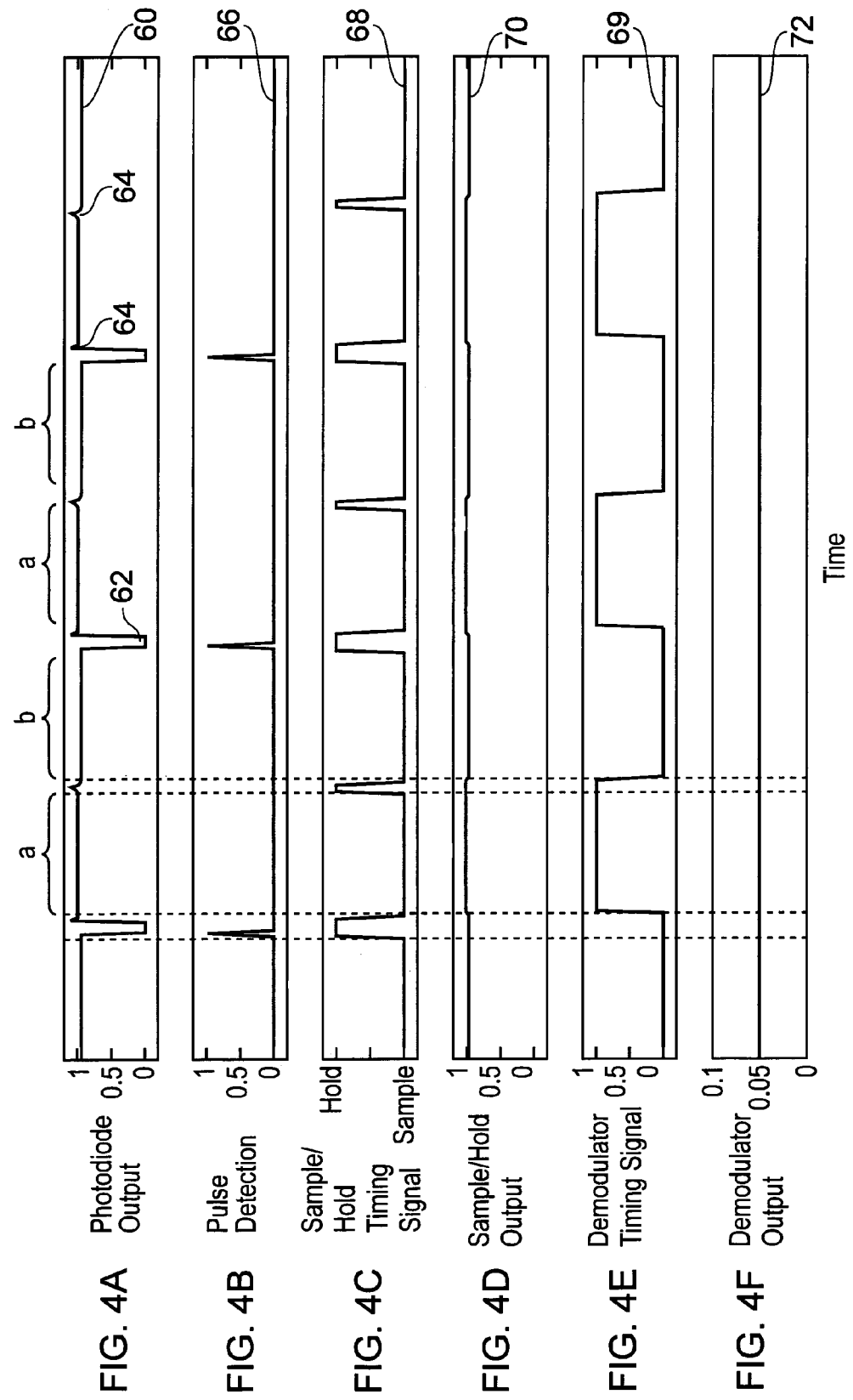

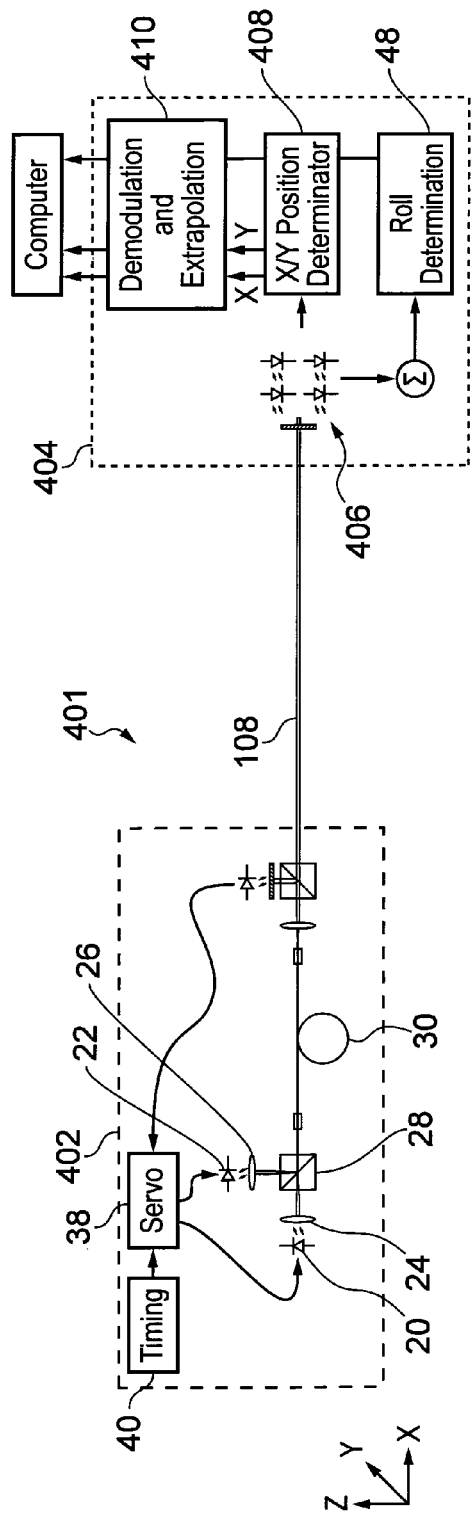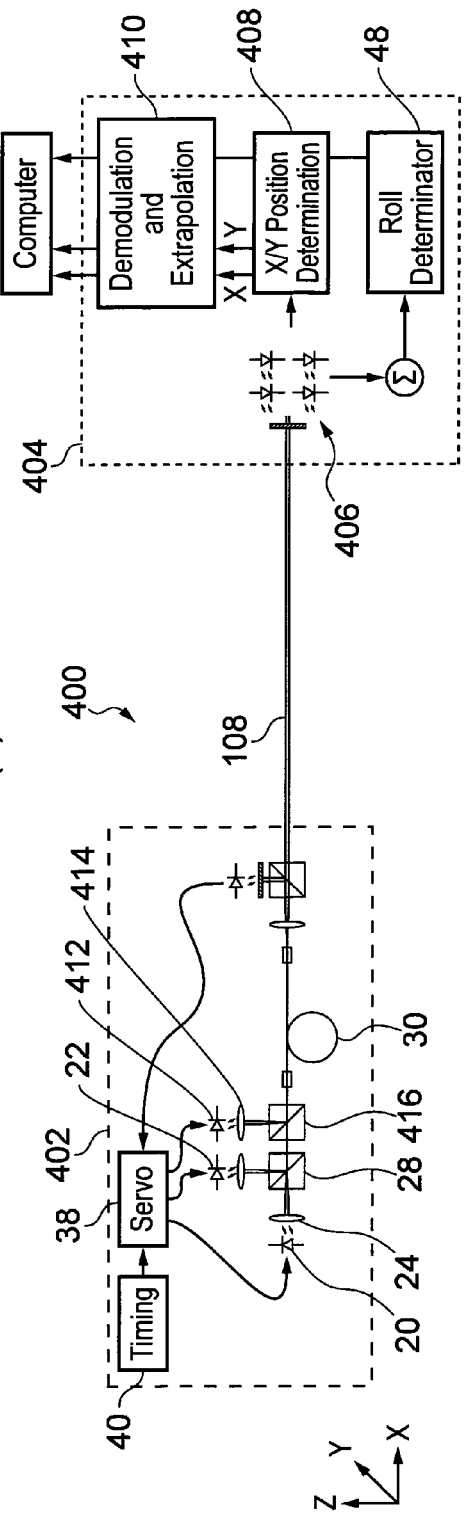

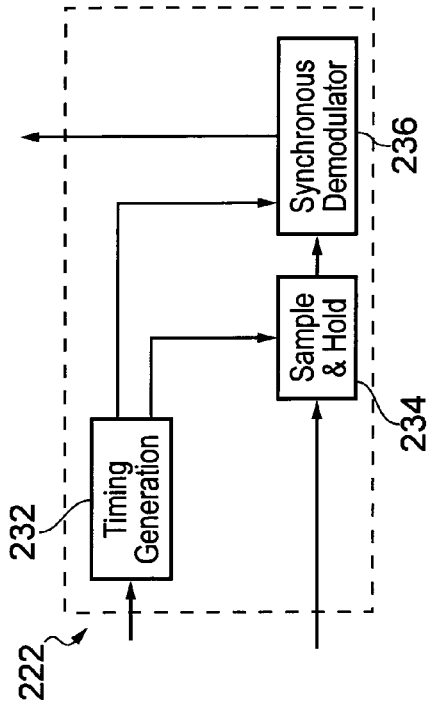
FIG. 8
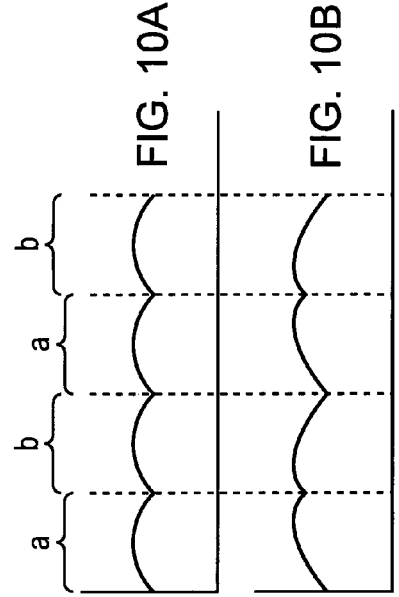
FIG. 10A
FIG. 10B
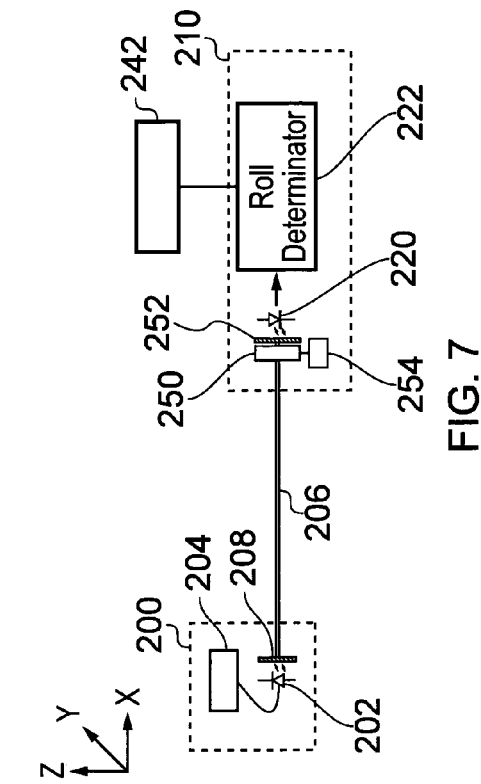
FIG. 7
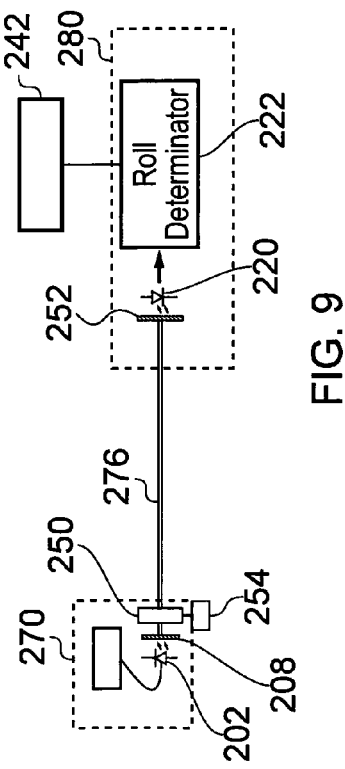
FIG. 9

ROTATION DETECTION KIT

This invention relates to a rotation detection kit.

Rotation detection kits enable relative rotation between two components to be detected. This is useful when it is necessary to know that two components have rotated relative to each other so that subsequent action can be taken. Rotation detection kits which enable the degree of rotation to be measured are useful when it is necessary to know by how much the components have rotated relative to each other. For example, such a rotation detection kit would be useful in determining the degree of rotation of a moving machine component relative to stationary machine component as the moving machine component travels along a trajectory. This enables the machine to be calibrated. In particular, such a rotation detection apparatus could be used to calibrate a co-ordinate positioning apparatus such as a co-ordinate measuring machine (CMM), a machine tool, or a rotating/tilting stage.

Rotation detection kits could also be useful in tracking systems, such as systems for accurately tracking the movement of a robot arm, or for instance tracking the movement of a tool mounted on the quill of a CMM.

The present invention relates to improvements in the precision of rotation detection kits.

According to a first aspect of the invention, there is provided a rotation detection kit, comprising: a beam source; a receiver comprising at least one beam intensity sensor; a polariser device; and a modulator configured to modulate at least one of i) the beam source and ii) a beam emitted by the beam source to create a discretely varying polarisation orientation thereby defining first and at least second temporally spaced beam portions which are incident on the polariser device and the beam sensor, the at least first and second temporally spaced beam portions having substantially identical profiles and at least an initial common propagation axis toward the polariser device.

Relative rotation between the polariser device and at least one of the other parts of the kit will cause a change in the intensity of the first and at least second beam portions detected by the sensor at any given moment in time. It has been found that the use of first and at least second beam portions defined by a discretely varying polarisation orientation enables the determination of rotation to be less susceptible to noise, and therefore can give rise to significant improvements in the precision of determining rotation, when compared to systems in which the polarisation orientation does not change at all or changes continuously at a constant rate. When using temporally spaced beam portions rotation can be detected by, for example, comparing the intensities of the temporally spaced beam portions as detected by the beam sensor. The use of temporally spaced beam portions that have substantially identical profiles and at least an initial common propagation axis helps to ensure that the beam portions are exposed to similar conditions, such as the environment through which they travel and the footprint they form on the sensor, thereby reducing the number of non-rotation related reasons as to why there might be a difference in what is detected by the at least one beam sensor.

The kit could be configured such that relative rotation between the polariser device and at least one of the beam source and modulator will cause a change in the intensity of the first and at least second beam portions detected by the sensor at any given moment in time. Accordingly, the polariser device could be rotatable relative to at least one of the beam source and modulator. The polariser device and beam source could be rotatable relative to each other. The polariser device and modulator could be rotatable relative to each other.

The beam source could emit a non-polarised beam. Preferably the beam source is a polarised beam source. Accordingly, the beam source can be configured to emit a polarised beam.

The first and at least second temporally spaced beam portions can be resolved by the polariser device. The first and at least second temporally spaced beam portions can fall on the beam intensity sensor sequentially.

The receiver may comprise a plurality of beam sensors. For instance, the receiver may comprise a first beam sensor for sensing the first beam portion and a second beam sensor for sensing the second beam portion. Preferably, the receiver comprises a single beam sensor for detecting each of the first and at least second beam portions after they have been resolved by the polariser device. When a single beam sensor is used to detect each of the first and second beam portions, changes in the changes in the conditions of the sensor will not give a false indication of rotation. Any such changes will affect the detection of all of the first and at least second temporally spaced beam portions in the same manner and to the same extent.

Preferably, the at least one beam sensor is a beam intensity sensor.

The receiver can be configured to provide an output based on the intensities of the at least first and second temporally spaced beam sources detected by the at least one beam intensity sensor.

The output of the receiver can be dependent on the relative detected intensities. The relative detected intensities can be dependent on rotation and so the output of the receiver can be used to determine that rotation has occurred. For instance, in embodiments in which relative rotation of the polariser device and the beam source affect the relative detected intensities, the output of the receiver can be used to determine that rotation has occurred between the beam source and polariser device.

Preferably, the receiver is configured to determine relative rotation based on the difference between the detected intensity of each of the first and at least second temporally spaced beam portions. Preferably, the receiver is configured to determine the extent of relative rotation based on the difference between the detected intensity of each of the first and at least second temporally spaced beam portions. For instance, in embodiments in which relative rotation of the polariser device and the beam source affect the relative detected intensities preferably, the receiver is configured to determine relative rotation between the beam source and the polariser device based on the difference between the detected intensity of each of the first and at least second temporally spaced beam portions. Preferably, the receiver is configured to determine the extent of relative rotation between the beam source and the polariser device based on the difference between the detected intensity of each of the first and at least second temporally spaced beam portions.

In particularly preferred embodiments, the rotation detection kit is be configured to measure rotation to an accuracy of 1 milliradian or less, more preferably 10 microradians or less, especially preferably less 5 microradians, for instance, approximately 1 microradian.

The profiles of the temporally spaced beam portions can be identical in that they have substantially the same shape, size and orientation. Accordingly, in instances in which the profile of the temporally spaced beam portions are not circular, then the temporally spaced beam portions should be oriented such that their profiles wholly overlap each other. Furthermore, as the temporally spaced beam portions have at least an initial common propagation axis, then this means that the beam portions will at least initially be projected toward the polariser device along a common path. Preferably, the first and at least second beam portions have a substantially common path as they propagate through the environment between the parts of the rotation detection kit. The beam portions could later diverge. This could happen for instance if the beam portions have different wavelengths (as described in more detail below). Optionally, the paths of the temporally spaced beam portions might be split in the receiver. This could, for example be so that the temporally spaced beam portions fall on different detectors.

As will be understood, each of the first and the at least second temporally spaced beam portions will define a footprint which falls on the at least one beam intensity sensor. In embodiments in which the first and second portions fall on the same beam intensity sensor, preferably, the rotation detection kit is configured such that the footprint of the first beam portion and the footprint of the at least second beam portion at least partially overlap each other. Preferably, the rotation detection kit is configured such that the footprint of the first beam portion and the footprint of the at least second beam portions on the sensor are co-aligned. Preferably, the rotation detection kit is configured such that the footprint of the first beam portion is identical to the footprint of the at least second beam portions. Preferably, the footprints are identical in at least one of shape, size and orientation. Most preferably the footprints are identical in at all of shape, size and orientation.

The wavelengths of the first and at least second temporally spaced beam portions can be different. That is the first beam portion can have a first wavelength and the second beam portion can have a second wavelength that is different to the first wavelength. The use of beam portions having different wavelengths can be advantageous as it can help enable a more accurate straightness measurement to be obtained in embodiments in which lateral alignment as well as rotation is measured from the first and second beam portions (as described in more detail below).

Preferably the wavelengths of the first and at least second temporally spaced beam portions are the same. This can be advantageous as it can ensure that the paths of the first and at least second temporally spaced beam portions are co-aligned, i.e. they propagate along a common path through the space between the beam source and receiver. This is advantageous because it helps to avoid the false detection of rotation due to dirt in the environment in which the rotation detection kit is used. Any such dirt will affect each of the first and at least second beam portions equally. For example, a particle of dust which falls in the path of the first portion will also fall in the path of the second portion and affect them both in the same way. This is also advantageous because the first and at least second beam portions can wholly overlap each other on the beam intensity sensor, thereby avoiding problems associated with the non-uniformity of the beam intensity sensor.

A beam intensity sensor suitable for use with the present invention is a device in the receiver which converts a physical property of each of the temporally spaced beam portions falling on it into an electrical output signal for use by the receiver. Sensors suitable for detecting the intensities of the first and the at least second temporally spaced beam portions and providing an output representative of the detected intensities, include photodetectors, such as photoresistors and photodiodes. The photodetectors need not necessarily be a single cell photodetector. For instance the photodetector could be a quad cell photodetector. This enables both beam intensity and position to be determined. The beam intensity sensor could also be any other sort of beam intensity and position sensor, e.g. such as an image sensor, for example a charge-coupled device (CCD) sensor or complementary metal-oxide-semiconductor (CMOS) sensor. This is advantageous because the output of the photodetector could also be used by the receiver to provide an output indicative of the position of the first and second beam portions on the beam intensity and position sensor. This can be advantageous as it can provide an indication of any lateral misalignment between the beam source and polariser device and/or receiver (in embodiments in which the receiver moves relative to the beam source). Accordingly, the receiver can be configured to provide an output based on the position of the first and second beam portions on the beam intensity and position sensor. The output could be an output indicative of the lateral alignment of the beam source relative to the polariser device and/or receiver (in embodiments in which the receiver moves relative to the beam source). Optionally, the beam intensity sensor could be a terahertz sensor.

As described above, the first and second beam portions can have different wavelengths. In this case, the first and second beam portions will fall on the beam intensity and position sensor at slightly different places due to beams portions of different wavelengths being diffracted as they travel through the air by different amounts. The difference in their position on the beam intensity and position sensor can be used to extrapolate back to a real lateral alignment measurement. This helps to avoid errors in such measurements caused by turbulence in the medium through which the beams propagate between the beam source and receiver. Accordingly, the receiver can be configured to obtain an extrapolated lateral alignment value from the position of the first and second beam portions on the beam intensity and position sensor. Techniques for performing such extrapolation are known and for example are described in U.S. Pat. No. 5,333,053 the entire content of which is incorporated into this specification by this reference.

Further details of a system in which beams of different wavelengths are used to determine rotation and/or lateral alignment are also disclosed in co-pending PCT application, titled DISPLACEMENT DETECTION KIT, filed on the same day as this application, with agents reference 778/WO/0 and claiming priority from UK Patent Application no. 0706821.6, the entire content of which is incorporated into this specification by this reference.

Polariser devices suitable for resolving the first and at least second electromagnetic beam portions include absorptive polarisers (e.g. fine wire grid or dichroic), and beam-splitting polarisers, (e.g. crystal polarisers, thin film polarisers and reflective polarisers).

In general, polariser devices can be characterised by a polarisation axis. For planar devices (such as fine wire, dichroic material, thin film) this is an axis within the plane of the device. For crystal optics, this is the crystal's optic axis and typically this is oriented to be in the plane of the input window. In known systems which are configured to measure rotation about the propagation axis the polarisation axis is configured such that the polarisation axis is normal to the propagation axis.

As will be understood, the propagation axis can be the axis along which the at first and at least second temporally spaced beam portions travel toward the polariser device. That is the propagation axis can be the at least initial common propagation axis. In embodiments in which the polariser device and source are moveable relative to each other in a linear dimension, this can be the direction in which they are linearly moveable.

The rotation detection kit could be configured such that the intensities of the first and second beam portions as detected by the at least one beam intensity sensor is substantially affected only by the rotation about an axis that extends parallel to the propagation axis of the beam emitted by the beam source. As will be understood, this can be the same as the at least initial common propagation axis. Accordingly, the receiver can be configured to provide an output indicative of the degree of roll based on the detected intensities of the first and second beam portions. This can be achieved by orienting the polariser device such that the angle between the polarisation axis of the polariser device and the polarisation orientation of the first and second beam portions varies only due to relative rotation about the propagation axis the beam emitted from the beam source. How the polariser device is oriented to achieve this depends on the type of polariser device used. This can be achieved, for example, by aligning the polariser device's polarisation axis such that it is perpendicular to the propagation axis.

In particular, the rotation detection kit could be configured such that the intensities of the first and second beam portions as detected by the at least one beam intensity sensor is substantially affected only by the relative rotation of the beam source and polariser device about an axis that extends parallel to the at least initial common propagation axis. Accordingly, the receiver can be configured to provide an output indicative of the degree of roll between the beam source and polariser device based on the detected intensities of the first and second beam portions.

The polariser device could be configured such that the intensities of the first and second beam portions as detected by the at least one beam intensity sensor is substantially affected by the rotation about an axis that extends non-parallel to the propagation axis of the beam emitted from the beam source. This can be achieved, for example, by aligning the polariser device's polarisation axis such that its angle relative to the propagation axis is not perpendicular.

As will be understood, depending on the configuration of the polariser device, the axis along which the first and at least second beam portions travel at the polariser device can be different to the propagation axis along which the at least first and second polarised beam portions travel from the source toward the polariser device, i.e. it can be different to the initial common propagation axis. Accordingly, the angle between the polarisation axis and the propagation axis can be taken as the angle between the polarisation axis and the axis along which the first and at least second beam portions will be travelling at the point the first and at least second beam portions are incident on the polariser device.

Accordingly, the polariser device could be configured to allow rotational movement other than roll (i.e. rotational measurements about an axis other than the propagation axis) to be detected by looking at the intensity of the beam portions as detected by the beam intensity sensor. Furthermore, it has been found that with such a configured polariser device, rotation about an axis that is perpendicular to the propagation axis affects the intensity of the polarised beam whose path it is in. Accordingly, the present invention can be used to measure rotation about an axis that extends perpendicular to the propagation axis, i.e. the at least initial common propagation axis. Accordingly, the receiver could be configured to determine the degree of one of what are commonly referred to as the pitch and yaw.

In particular, the polariser device could be configured such that the intensities of the first and second beam portions as detected by the at least one beam intensity sensor is substantially affected by the relative rotation of the beam source and polariser device about an axis that extends non-parallel to the at least initial common propagation axis. Furthermore, the present invention can be used to measure relative rotation between the beam source and polariser device unit about an axis that extends perpendicular to the propagation axis. Accordingly, the receiver could configured to determine the degree of one of what are commonly referred to as the pitch and yaw between the beam source and polariser device. Details of such a system are disclosed in co-pending PCT application, titled ROTATION DETECTION KIT, filed on the same day as this application, with agents reference 779/WO/0 and claiming priority from UK Patent Application no. 0706821.6, the entire content of which is incorporated into this specification by this reference.

The polariser device can be provided as part of the receiver such that the polariser device and receiver are manipulable as a single unit. The polariser device can be mounted to or within the receiver such that it cannot move relative to the receiver.

Optionally, the polariser device can be provided as a separate component to the receiver. In this case, the receiver can be located anywhere with respect to the beam source and polariser device so long as the resolved first and at least second beam portions can be directed to fall on the beam intensity sensor. Optionally, the beam source and receiver can be provided as a beam source/receiver unit which is manipulable as a single unit. In this case it will be necessary to provide a reflector arrangement, and/or at least one retroreflector, so that the at least first and second beam portions emitted by the beam source/receiver unit are reflected back toward the beam source/receiver unit once it has been polarised by the polariser device.

The beam source can have features which enable it to be mounted to a first component of a machine so that it cannot move relative to the first component. The polariser device can have features which enable it to be mounted to a second component of a machine so that it cannot move relative to the second component. When the polariser device is provided as part of the receiver, the receiver can have features which enable it to be mounted to the second component of the machine so that it cannot move relative to the second component. Such features could comprise a mount. The mount could comprise a first part which is fastened to a component of the machine, and a second part which is mounted to the part to be mounted, such as the beam source, polariser device or receiver.

Optionally, the first and second parts have co-operating formations which ensure a repeatable mounting relative to the machine to be achieved in at least five degrees of freedom. For example, the beam source could have formations which enable it to be kinematically mounted to a component of the machine. The polariser device could also have formations which enable it to be kinematically mounted to a component of the machine. The receiver could also have formations which enable it to be kinematically mounted to a component of the machine.

As will be understood, as the polarisation orientation varies discretely the polarisation orientation of a beam reaching the polariser will be such that the polarisation orientation is not uniformly varying, i.e. the polarisation orientation will not continuously rotate at a constant velocity. Rather, the polarisation orientation could, for example, oscillate. For instance, the polarisation orientation could oscillate back and forth through 270° or less, for instance 180° or less, for example through 90° or less. In this case the intensity of each of the first and at least second temporally spaced beam portion as detected by the beam intensity sensor will vary with time. The level of intensity of a beam portion as detected by the beam intensity sensor at any one given point in time will depend on the degree of rotation between the beam source and the polariser device. Accordingly, the output from the receiver could be based on the comparison of at least a part of the intensity of the beam portions. For instance, the output from the receiver could be based on the intensity of the beam portions as detected by the receiver at the boundaries of the temporally spaced beam portions.

The polarisation orientation could alternate between predetermined polarisation states. For instance, the polarisation orientation could alternate between at least two polarisation states. In this case, the first beam portion will have a first polarisation state and the at least second beam portion will have second polarisation state that is different to the first polarisation state. The polarisation states could be substantially linear. In this case, preferably, the acute angle between planes that extend parallel to the first and second substantially linear polarisation states is at least 45 degrees, more preferably at least 75 degrees. In embodiments in which there are only two polarisation states, preferably the first and second linear polarisation states are orthogonal to each other. In general, a more accurate determination of the extent of rotation can be determined when there is a larger acute angle.

Depending on the method by which the first and at least second beam portions are generated, the polarisation states of the first and second beam portions could rotate slightly over the duration of their emission. Preferably, the polarisation states of each of the first and at least second temporally spaced beam portions rotate through not more than 25 degrees during their emission, more preferably through not more than 15 degrees, especially preferably through not more than 5 degrees, for example through not more than 1 degrees. Most preferably, the first and second polarisation states do not rotate.

Furthermore, the polarisation orientation could be continuously rotating but at a non-constant velocity (e.g. it might rotate quickly between prolonged periods of slowly rotating polarisation orientations). For example, the polarisation orientation could be held for prologoned periods at relative rotations of 0°, 90°, 180° and 270° and quickly rotated between those orientations. In this case, the output from the receiver could be based on the difference in the intensities of the orthogonal beams during the prolonged periods at which the polarisation orientation is held, much in the same way as the method described in more detail below.

As the first and at least second beam portions are temporally spaced the receiver is configured to distinguish between the first and at least second beam portions based on the time at which they are detected by the sensor. Preferably the first and second temporally spaced beam portions are wholly temporally spaced. That is preferably the first and at least second temporally spaced beam portions do not temporally overlap. In particular, preferably, the modulator is configured to create only one of the first and at least second beam portions at any one instant in time. However, the first beam portion and the at least second beam portion need not be wholly temporally distinct. Accordingly, there can be at least one point in time in the emission of the first beam portion at which the second portion is emitted and/or at least one point in the emission of the second beam portion at which the first portion is also emitted. That is the first and second beam portions can partially overlap in time. Preferably, the beam source is configured to emit the first beam portion and the at least second beam portion for equal amounts of time.

Preferably, the modulator is configured to create a plurality of first beam portions and a plurality of at least second beam portions. This is advantageous as it enables the relative rotation between the beam source and the polariser device to be determined more than once. Preferably, the modulator is configured to create the plurality of first and at least second beam portions in a predetermined sequence. Preferably the sequence is a repetitive sequence. This makes it easier for the receiver to determine which of the first and at least second beam portions the sensor is detecting.

Preferably, the modulator is configured to alternate between creating the first beam portion and the second beam portion. Preferably, the modulator is configured to alternate between creating the first and the second beam portions at a predetermined frequency. The preferred predetermined frequency will depend on a number of factors including the accuracy to which the rotation detection kit is to work and the required measurement bandwidth.

Preferably, the modulator is configured to modulate the beam source so as to create the temporally spaced beam portions. Accordingly, in this case the beam source is configured to emit the temporally spaced beam portions.

The beam source could be configured to continuously emit a linearly polarised beam. In this case, preferably, the modulator is configured to modulate the linearly polarised beam to create the temporally spaced beam portions. For instance, the modulator could be configured to intermittently rotate the polarisation state of the linearly polarised beam before the polarised beam passes through the polariser device. For instance, the modulator could comprise a polarisation controller. Preferably, such a polarisation controller is an electronically controlled polarisation controller. For instance, the polarisation controller could be an electromagnetic device or an electrooptic device, such as an electro-optic crystal. A suitable electrooptic device is a Lithium Niobate crystal waveguide.

Preferably, the receiver is configured to receive a synchronisation signal which it can use to synchronise itself with the receipt of the temporally spaced beam portions. This increases the accuracy of the receiver in distinguishing between the temporally spaced beam portions. Preferably, the receiver synchronously demodulates the temporally spaced beam portions.

Preferably, the modulator is configured to send the synchronisation signal to the receiver. The synchronisation signal could be sent to the receiver via a wireless communication mechanism. This is particularly advantageous in embodiment in which the modulator and receiver are remote to each other as it removes the need for a wired connection between the modulator and the receiver. Preferably, the synchronisation signal is detected by the beam intensity sensor. This is advantageous as it avoids the need for a separate communication mechanism to be provided.

Preferably, the synchronisation signal comprises a pulse between temporally spaced beam portions. For example, the synchronising signal could comprise a time gap between the emission of temporally spaced beam portions. Preferably, the gap is not longer than 4 µS.

The receiver can also be configured to record the average intensity of the first and at least second beam portions, using the gap to compensate for any ambient lighting. This can be advantageous in embodiments in which measurement of rotation is based on the difference in the detected intensities of the beam portions as it can help in compensating for changes in the detected intensities, for instance due to environmental reasons.

The beam source can comprise a single beam emitter. In this case, the modulator could comprise an emitter polariser device which alternates the polarisation axis through which the beam emitted by the single emitter passes. The modulator could alternate the polarisation axis through which the beam emitted by the single emitter passes either before it leaves the beam source (in which case the modulator is modulating the beam source) or once it had been emitted from the beam source (in which case the modulator is modulating a beam emitted from the beam source). In either case, the first and at least second portions could be generated by alternately polarising the beam emitted by the single emitter using first and second polarisers having first and second polarisation axes. The first and second polarisers could be mounted on a mechanical device which alternately positions the polarisers in the path of the beam emitted by the single emitter. For instance, a plurality of alternately positioned first and second polarisers could be mounted annularly around a device which can be rotated about an axis so that the each of the first and second polarisers passes in the path of the beam. Optionally, the first and at least second electromagnetic portions could be generated by passing the electromagnetic beam emitted by the single emitter through an electrically controllable polarisation rotation device, which can control the polarisation of light passing through it. For instance, the first and at least second portions could be generated by passing the beam emitted by the single emitter through an electro-optic crystal wherein the polarisation axis of the electro-optic crystal changes due to a change in voltage being applied across it. In this case, and in cases in which the receiver comprises the polariser device, the modulator could form part of the receiver.

Optionally, the beam source comprises a first emitter for emitting the first beam portion and at least a second emitter for emitting the at least second beam portion. As will be understood, the beam source could comprise at least a third emitter for emitting a third beam portion. Accordingly, the modulator will preferably be configured to alternately modulate the first and at least second emitters.

The first and at least second emitters can be laser diodes. As will be understood, the particular operating characteristics of the laser diode will depend on the requirements of the rotation kit, such as the accuracy requirements. Preferably the laser diodes are configured to operate in the visible region. This helps increase the ease of alignment of the beam source and receiver and is also advantageous for safety reasons. Suitable emitters also include super luminescent light emitting diodes (SLEDs).

The beam source can comprise a beam conditioner through which the beam to be emitted by the beam source passes. This can help to ensure consistency in the shape and orientation of the beam emitted from the beam source. This can be useful in embodiments in which the beam source contains only a single beam emitter as well as embodiments in which there is more than one beam emitter. Preferably, the beam conditioner comprises a waveguide or equivalent. Preferably, the waveguide is a single mode waveguide. Preferably the beam conditioner comprises a fibre optic. Preferably, the fibre optic is a polarising maintaining fibre optic. The fibre optic could be a hollow fibre optic or a non-hollow fibre optic. Preferably the fibre optic is a single mode fibre optic.

Preferably, the beam source comprises a beam combiner for combining the paths of the first and at least second beam portions such that they are emitted along a common path, i.e. they at least initially have a common propagation axis from the beam source. Accordingly, it will appear as if what emerges from the beam source is a single beam, having first and second portions.

Preferably, the beam combiner comprises a reflective interface arranged to combine the beams emitted from the first and at least second emitters along a common path. Preferably, the reflective interface is a polarising beam splitter. Preferably, the beam combiner further comprises a fibre optic through which the first and at least second beam portions pass before being emitted from the beam source. Preferably, the fibre optic is a polarising maintaining fibre optic. The use of a fibre optic can help to co-align the paths of the first and at least second beam portions. The use of a fibre optic can also help to ensure that the footprints of the first and at least second beam portions are substantially identical.

The first emitter could be configured to emit a beam portion having a first polarisation state. The second emitter could be configured to emit a beam portion having a second polarisation state. Optionally, the first and second emitters could be configured to emit non-polarised first and second beam portions. Optionally, the beam source could comprise first and second emitter polariser devices for polarising the beam portions emitted from the first and second emitters into the first and second polarisation states.

As will be understood, the first and second beam portions can be any suitable electromagnetic beam portions. Preferably, the first and second beam portions have a wavelength in the terahertz to the ultraviolet regions. Preferably, the first and at least second beam portions are optical beam portions. Preferably, the first and second beam portions have a wavelength in the infrared to ultraviolet regions.

Preferably, the first and second beam portions have a wavelength in the visible regions of the electromagnetic spectrum. For instance, the first beam portion and the at least second beam portions can be laser beam portions.

Preferably, the receiver is capable of providing an output indicative of the extent of the rotation based on the detected intensities. In particular, preferably, the receiver is capable of providing an output indicative of the extent of the relative rotation between the beam source and the polariser device based on the detected intensities. Preferably, the receiver is capable of providing an output indicative of the extent of the relative rotation based on the difference in the detected intensity of each of the first and at least second beam portions. This is advantageous as it enables a user to determine by how much the transmitter and polariser device have rotated relative to each other, rather than just that they have rotated. The receiver can be configured to output a signal indicating that there is no rotation between the transmitter and the polariser device when the detected intensity of each of the first and at least second beam portions are the same.

Preferably, the rotation detection kit further comprises a splitter for directing each of the first and at least second beam portions towards both the polariser device and towards a second polariser device. Preferably, the second polariser device is fixed relative to the beam source. Preferably, the rotation detection kit comprises at least a second beam intensity sensor for detecting the intensity of the first and at least second portions resolved by the second polariser device. Preferably, the rotation detection kit comprises a second receiver comprising the at least second beam intensity sensor. Preferably the second receiver is configured to provide an output that is dependent on the detected intensities.

Providing two sets of polariser devices and beam intensity sensors is advantageous as it enables one of the sets to servo the first and second beam portions to compensate for any unexpected variation in the polarisation states of the first and second beam portions. This is especially the case when the polarisation states of the first and second beam portions are substantially linear as the servoing could be used to compensate for any unexpected rotation in the polarisation orientation. The first and second beam portions could be servoed by modulating the intensities of the first and second beams emitted. Optionally, a polarisation controller could positioned in the path of the first and second beams and the first and second beam portions could be servoed by the polarisation controller. Preferably, such a polarisation controller is an electronically controlled polarisation controller. For instance, the polarisation could be an electromagnetic device or an electrooptic device, such as an electro-optic crystal. A suitable electrooptic device is a Lithium Niobate crystal waveguide.

For instance, the beam source can be configured to receive the output of the second receiver and to servo the intensities of the first and second beam portions such that the intensities detected by the at least second sensor are constant. As will be understood, this does not necessarily mean that the intensities are servoed so that intensity of the first portion is the same as the intensity of the second portion. Rather, it can mean that the intensity of the or each first beam portions is constant over time, and the intensity of the or each second beam portion(s) is constant over time. In this case, the receiver can be configured to output a signal indicative of rotation. In particular, the receiver can be configured to output a signal indicative of relative rotation between the beam source and the polariser device.

Optionally, the beam source can be configured to receive the output of the receiver and to servo the intensities of the first and second beam portions such that that the intensities detected by the sensor at the receiver are constant. Accordingly, the output of the second receiver can be configured to output a signal indicative of relative rotation between the beam source and the polariser device. In this case, preferably the second receiver is capable of providing an output indicative of the extent of the relative rotation between the beam source and the polariser device based on the detected intensities. Preferably, the second receiver is capable of providing an output indicative of the extent of the relative rotation based on the difference in the detected intensity of each of the first and at least second beam portions. This is advantageous as it enables a user to determine by how much the beam source and polariser device have rotated relative to each other, rather than just that they have rotated. The second receiver can be configured to output a signal indicating that there is no rotation between the beam source and the polariser device when the detected intensity of each of the first and at least second beam portions are the same.

Preferably, the rotation detection kit further comprises an input device for adjusting the intensity of each of the first and at least second beam portions. This is advantageous because it increases the ease and speed by which the rotation detection kit case can be setup. The input device avoids the need to mechanically adjust the relative rotational position of the beam source and the polariser device so that the intensity of each of the first and at least second electromagnetic beam portions detected by the sensor are at a predetermined intensity level. Rather, the input device can be used to adjust the intensity of at least one of the first and at least second beam portions so that the intensity of each of the first and at least second beam portions detected by the sensor are at a predetermined intensity level. Furthermore, the input device can used to control the beam source such that the relative intensities of the first and second beams as detected by the at least one beam intensity sensor are within a predetermined relative intensity range.

The input device could comprise an interface by which a user can manually adjust the intensity of each of the first and at least second beam portions.

Preferably, the input device is configured to receive an output signal from the receiver which indicates the detected intensity of each of the first and at least second beam portions. Preferably, the input device can be operated in a setup mode in which the input device adjusts the intensity of each of the first and at least second beam portions in response to the output from the receiver. Preferably, the input device is configured to adjust the intensity of each of the first and at least second beam portions emitted from the beam source so that the intensity of each of the first and second beam portions detected by the sensor are at predetermined intensity levels. Preferably, the predetermined intensity levels are that the intensity of each of the first and at least second beam portions are substantially equal.

Preferably, the input device is configured to adjust the intensity of each of the first and second beam portions emitted by the beam source by controlling the intensity of the beam portions emitted by the or each emitter in the beam source.

Preferably, the input device can be operated in an operation mode in which the input device does not adjust the intensity of each of the first and second beam portion regardless of the intensity of each of the first and at least second beam portions detected by the sensor.

According to a second as aspect of the invention there is provided a rotation detection kit, comprising: a polarised beam source; a receiver comprising a beam intensity sensor; a polariser device for location in the path of a beam emitted from the polarised beam source and received by the beam intensity sensor, the polariser device being rotatable relative to the polarised beam source; and a modulator configured to modulate at least one of i) the polarised beam source and ii) a polarised beam emitted by the polarised beam source to create a discretely varying polarisation orientation thereby defining at least first and second temporally spaced beam portions which pass through the polariser device and fall on the beam intensity sensor sequentially, the at least first and second temporally spaced beam portions having substantially identical profiles and at least an initial common propagation axis toward the polariser device; the receiver being configured to provide an output based on the intensities of the at least first and second temporally spaced beam portions detected by the beam intensity sensor.

According to a third as aspect of the invention there is provided a displacement detection kit, comprising: a beam source; a receiver comprising a beam sensor; a polariser device for location between the polarised beam source and the beam sensor; a modulator configured to modulate the polarised beam source to create a discretely varying polarisation orientation thereby defining first and at least second temporally spaced beam portions; and in which the beam source comprises a beam conditioner for conditioning the first and at least second temporally spaced beam portions before they are emitted toward the receiver.

According to a fourth aspect of the invention there is provided, a displacement detection kit, comprising: a beam source; a receiver comprising a beam sensor; a polariser device for location between the polarised beam source and the beam sensor; a modulator configured to modulate at least one of i) the beam source and ii) a beam emitted by the beam source to create a discretely varying polarisation orientation defining first and at least second temporally spaced beam portions which are incident on the polariser device and the beam sensor sequentially, and in which at least two beam portions having non-identical wavelengths.

According to a fifth aspect of the invention there is provided a displacement detection kit, comprising: a polarised beam source; a receiver comprising a beam intensity and position sensor; a polariser device for location between the polarised beam source and the beam intensity sensor, the polariser device being displaceable relative to the polarised beam source; and a modulator configured to modulate at least one of i) the polarised beam source and ii) a polarised beam emitted by the polarised beam source to create a discretely varying polarisation orientation defining first and at least second temporally spaced beam portions such that they are resolved by the polariser device and fall on the beam intensity sensor sequentially such that the intensities of the at least first and second temporally spaced beam portions is dependent on the relative rotation of the polarised beam source and the polariser device, and to create at least two beam portions having non-identical wavelengths; the receiver being configured to provide an output indicative of rotation of the beam source relative to the polariser based on the intensities of the first and at least second temporally spaced beam portions detected by the beam intensity sensor, and to provide an output indicative of the lateral position of the first and second beam portions on the beam intensity and position detector.

The beam portions having different wavelengths will be diffracted by different amounts as they travel between the polarised beam source and the receiver. Turbulence in the medium through which the beam portions propagate will exacerbate the diffraction of the beam portions of different wavelengths. The difference in the diffraction can be detected by determining the position on which the two beam portions fall on the at least one beam intensity sensor. The difference in their position on the beam intensity and position sensor can be used to extrapolate back to a real lateral alignment measurement. Accordingly, the receiver can be configured to obtain an extrapolated lateral alignment value from the position of the first and second beam portions on the beam intensity and position sensor. As will be understood, the lateral alignment could be for example the alignment between the polarised beam source and the receiver in embodiments in which the receiver is configured to be free to move relative to the polarised beam source. In embodiments in which at least one reflector unit that is laterally moveable relative to beam source or receiver and arranged to reflect the beam emitted from the beam source to the receiver, then the lateral alignment could be the alignment between the reflector unit and beam source or receiver.

Techniques for performing such extrapolation are known and for example are described in U.S. Pat. No. 5,333,053 the entire content of which is incorporated into this specification by this reference.

Furthermore, relative rotation of the polariser device and the polarised beam source will cause a change in the intensity of the first and at least second beam portions detected by the sensor. When using temporally spaced beam portions, relative rotation between the polarised beam source and the polariser can be detected by, for example, comparing the intensities of the temporally spaced beam portions as detected by the beam intensity sensor.

Accordingly, the invention has the advantage that both rotational and lateral alignment measurements can be obtained from the same system. This can provide advantages in terms of efficiency, reliability and space.

As will be understood, this aspect of the invention need not necessarily require that the temporally spaced beam portions have substantially identical profiles and at least an initial common propagation axis. However, this might be preferred as this can help to ensure that the beam portions are exposed to identical conditions, such as the environment through which they travel and the footprint they form on the sensor, thereby reducing the number of non-rotation related reasons as to why there might be a difference in the detected intensities.

Preferably, the receiver comprises a beam intensity and position sensor for detecting the intensity of each of the beam portions. In this case, preferably, the footprint of each of the first and at least second beam portions on the beam intensity sensor at least partially overlap.

The first and second beam portions can be the two beam portions having non-identical wavelengths. Accordingly, the first beam portion can have a first wavelength and the second beam portion can have a second wavelength that is different to the first wavelength. This is advantageous as the same beam portions can be used to measure both rotation and lateral alignment. Preferably, the first and second beam portions have the same wavelength and the modulator is configured to modulate at least one of i) the polarised beam source and ii) a polarised beam emitted by the polarised beam source to create at least a third beam portion having a wavelength that differs to that of the first and second beam portions. Accordingly, in this case, the at least two beam portions having non-identical wavelengths comprise one of the first and second beam portions and the third beam portion. This is advantageous as the use of the same wavelength for the first and second beam portions enables an accurate measurement rotation measurement to be taken for the reasons described above in connection with the first aspect of the invention. The third beam portion need not be polarised.

According to a sixth aspect of the invention there is provided, a rotation detection kit, comprising: a transmitter for emitting first and at least second electromagnetic beam portions respectively having first and at least second discrete, substantially linear polarisation states; a polariser device having a polarisation axis for resolving each of the first and the at least second electromagnetic beam portions into two orthogonal components, the polariser device being rotatable relative to the transmitter so as to change the relative orientation of the polarisation axis and the transmitter; and a receiver, comprising at least one sensor for detecting the intensity of one of the orthogonal components of each of the first and at least second electromagnetic beam portions, and which is configured to provide an output based on the detected intensities.

According to another aspect of the invention there is provided, a rotation detection kit, comprising: a transmitter for generating at least one beam having at least one substantially linear polarisation state; a receiver, comprising at least one sensor for detecting the intensity of the at least one beam; a polariser device for location in the path of the at least one beam between the transmitter and the sensor, the polariser device being rotatable relative to the transmitter; and a modulator for creating temporally spaced beam portions each having substantially linear polarisation states, along at least a part of the at least one beam, such that the sensor detects each beam portion sequentially, in which the intensity of each of the beam portions detected by the at least one sensor is dependent on the relative rotation between the transmitter and polariser device and in which the receiver is configured to provide an output based on the detected intensities.

The transmitter can comprise the modulator. The modulator can be configured such that the transmitter emits a beam having temporally spaced, first and at least second polarisation states. The receiver can comprise the modulator.

According to a further aspect of the invention there is provided, a rotation detection kit, comprising: a transmitter for generating a beam having a substantially linear polarisation state; a polariser device, rotatable relative to the transmitter for resolving the beam into two orthogonal components; at least one sensor for detecting the intensity of each of the orthogonal components; and a switcher for modulating the orthogonal components such that the sensor alternately detects each orthogonal component.

According to a yet further aspect of the invention there is provided a method of detecting relative rotation, comprising: i) emitting, from a transmitter, first and at least second electromagnetic beam portions, having first and at least second discrete substantially linear polarisation states respectively; ii) resolving the first and at least second portions via a polariser device having a polarisation axis into two orthogonal components, in which the polariser device is rotatable relative to the transmitter so as to change the relative orientation of the polarisation axis and the transmitter; iii) subsequently detecting, via at least one sensor, the intensity of one of the orthogonal components of each of the first and at least second portions, and iv) providing an output based on the detected intensities.

Step iii) can be performed by a single sensor. The first and at least second electromagnetic beam portions can be emitted along co-aligned paths. The first and at least second electromagnetic beam portions can be temporally discrete. The method can further comprise, setting up the transmitter by: adjusting the transmitter so that the intensity of each of the first and at least second electromagnetic beam portions as detected by the sensor are the same as each other.

According to a yet further aspect of the invention there is provided a rotation detection kit, comprising: at least one polarised beam source; a receiver comprising at least one beam intensity sensor; a polariser device for location between the at least one polarised beam source and the beam intensity sensor, the polariser device being rotatable relative to the at least one polarised beam source; and a modulator configured to create temporally spaced beam portions, such that the at least one beam intensity sensor detects each beam portion sequentially; in which the intensity of each temporally spaced beam portion reaching the sensor is dependent on the relative rotation between the polarised beam source and the polariser device, the receiver being configured to provide an output based on the detected intensities of the temporally spaced beam portions.

As will be understood, the above described features in connection with the first aspect of the invention can also be used in combination with the other aspects of the invention where appropriate.

Embodiments of the invention will now be described, by way of example only, and with reference to the accompanying drawings, in which.

Figure 3:
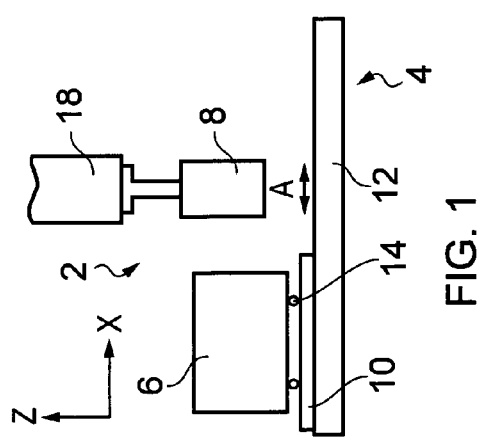
FIG. 3 shows a block circuit diagram of the roll determinator shown in FIG. 2.
Figure 2:
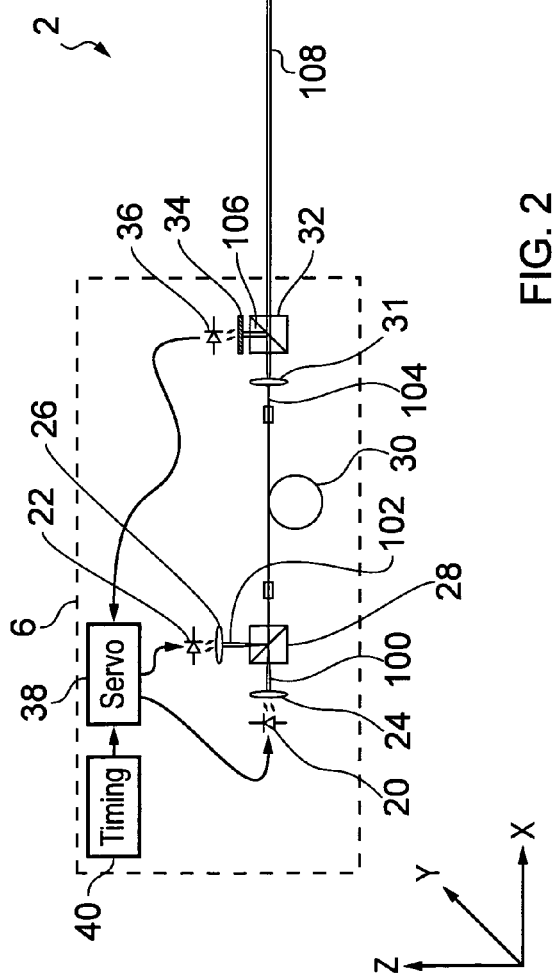
FIG. 2 shows a schematic diagram of the inside of the rotation detection kit shown in FIG. 1.
Figure 5:
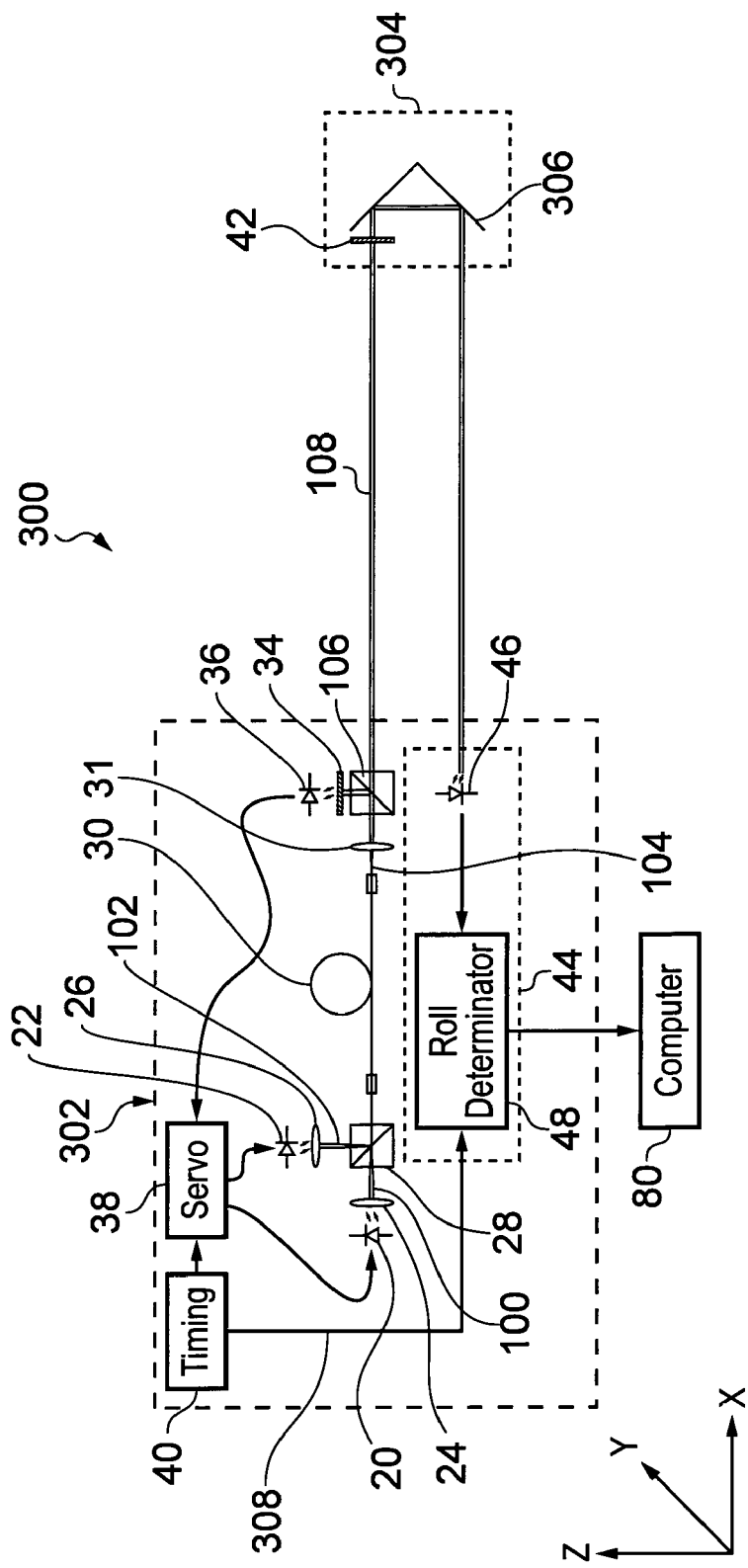
Figure 11:
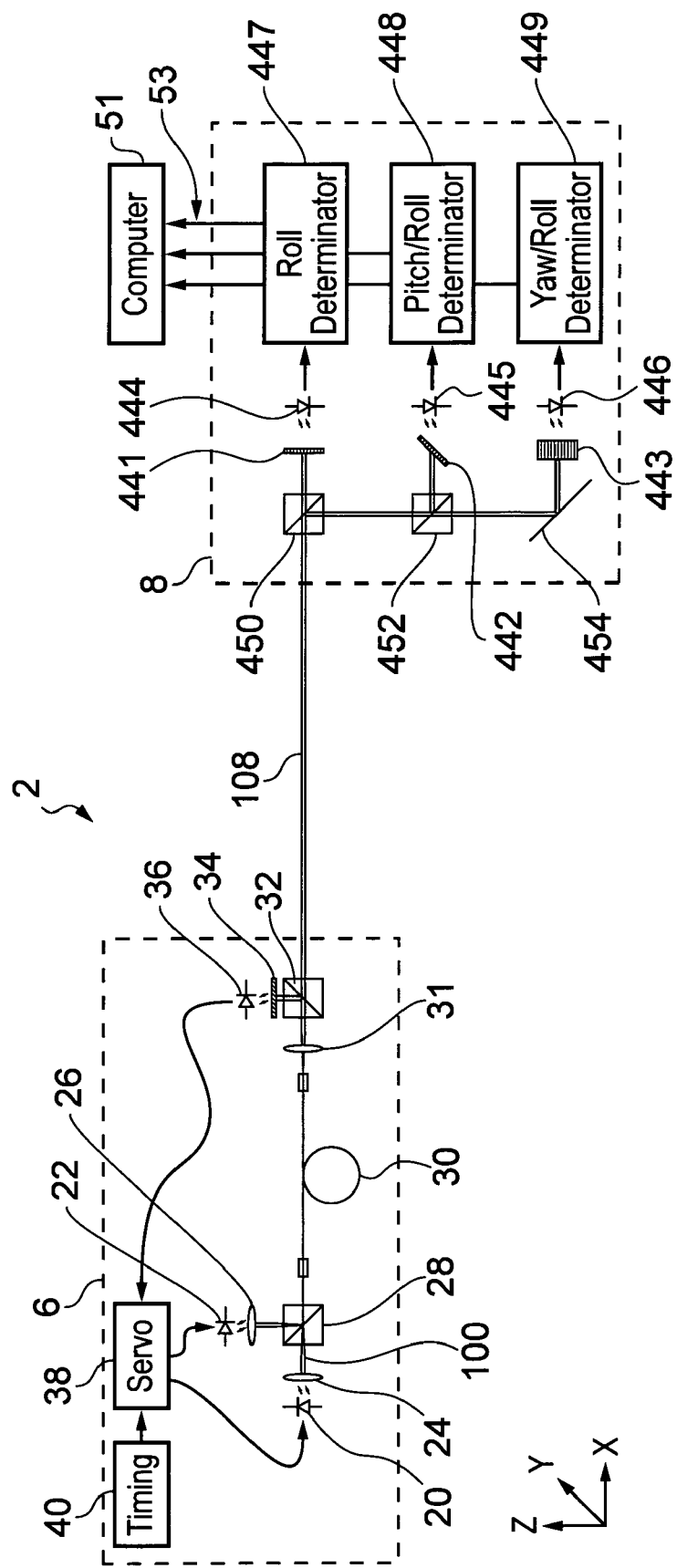
Figure 12A:
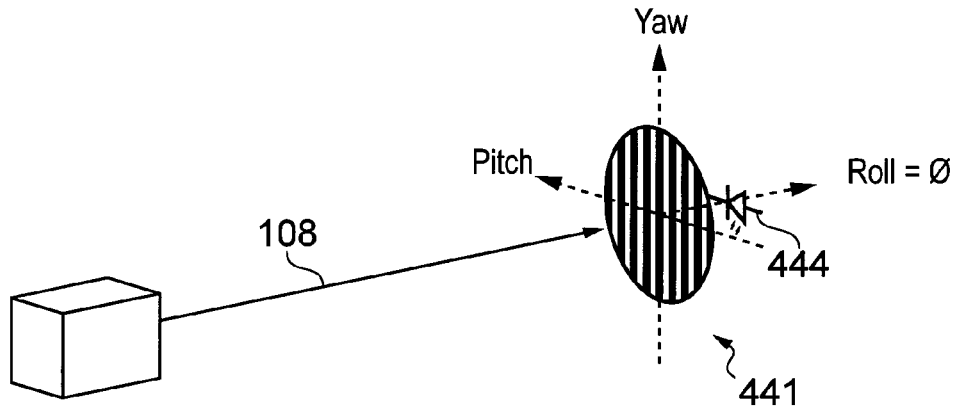
Figure 12B:
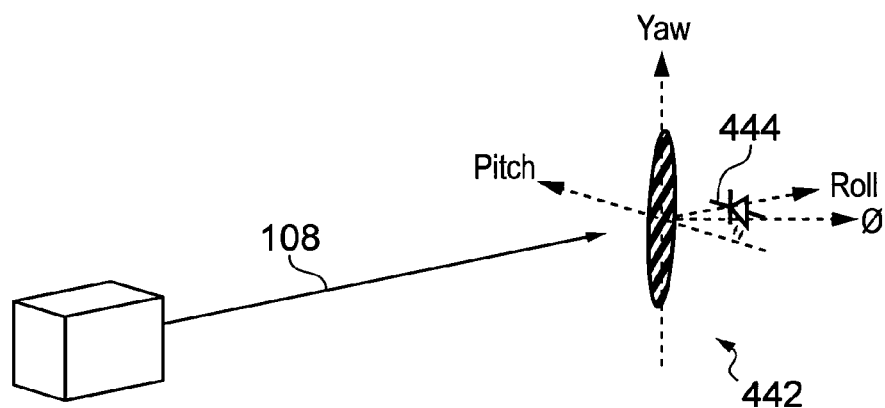
Figure 12C:
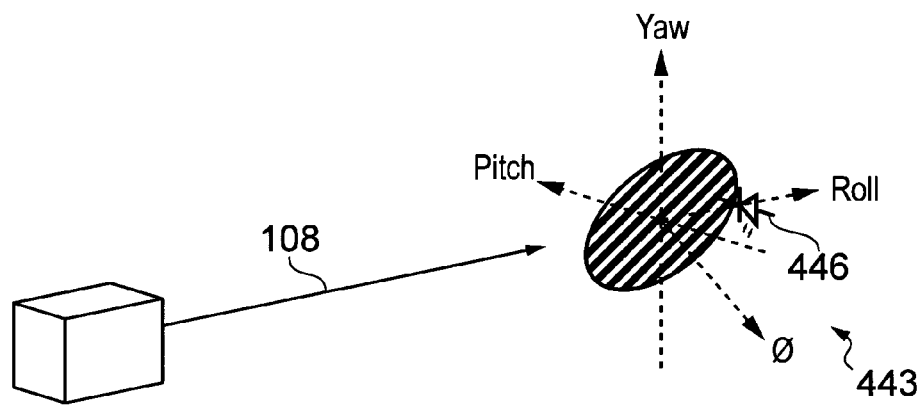

FIGS. 4(a) to (f) show example output signals for the photo-diode, pulse detector, timing generation unit, sample and hold unit and synchronous demodulator unit shown in FIG. 3;

FIG. 5 shows a schematic diagram of a rotation detection kit according to an alternative arrangement of the kit shown in FIG. 2;

FIG. 6a shows a schematic diagram of a rotation detection kit according to a second embodiment of the invention;

FIG. 6b shows a schematic diagram of a rotation detection kit according to a third embodiment of the invention;

FIG. 7 shows a schematic diagram of a rotation detection kit according to a third embodiment of the invention;

FIG. 8 shows a block circuit diagram of the roll determinator shown in FIG. 7;

FIG. 9 shows a schematic diagram of a rotation detection kit according to a fourth embodiment of the invention;

FIGS. 10(a) and (b) show example output signals for the photo-diode, in embodiments in which the temporally spaced beam portions are defined by an oscillating polarisation orientation;

FIG. 11 illustrates an embodiment of the invention which measures roll, pitch and yaw; and FIGS. 12(a) to (c) schematically illustrate the relative arrangement of the polarisers of FIG. 11.

Figure 1:
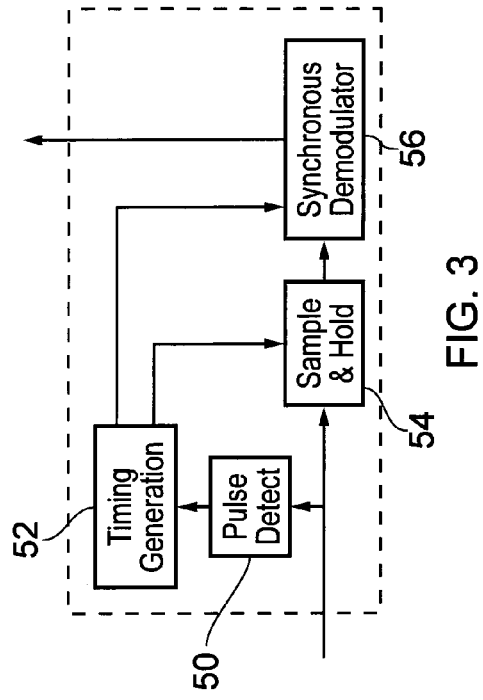
FIG. 1 shows a rotation detection kit according to the invention mounted on a coordinate measuring machine (CMM)

Referring to the figures, FIG. 1 shows a rotation detection kit 2 according to the present invention, mounted on a coordinate measuring machine (CMM) 4. The rotation detection kit 2 comprises a polarised beam source 6 and a receiver unit 8. The polarised beam source 6 is mounted on a machine table 12 of the CMM 4 via a base unit 10 so that they cannot move relative to each other. The receiver unit 8 is mounted on a quill 18 of the CMM 4 so that they cannot move relative to each other. In the embodiments described, the rotation detection kit 2 is used to determine at least one of the relative roll, pitch and yaw between the polarised beam source 6 and the part mounted to the quill 18 about the propagation axis of the beam emitted from the polarised beam source as they move relative to each other along a trajectory.

The polarised beam source 6 and the base unit 10 mounted on the machine table 12 are provided with complementary parts of a kinematic support 14 which enable the polarised beam source 6 to be accurately aligned along any of the X, Y, Z, −X and −Y axes of the CMM or along any other desired direction. Such kinematic supports for aligning optical units are known, such as those disclosed in International Patent Application no. PCT/GB01/03096.

In use, the receiver unit 8 is moved by the quill 18 along a path parallel to the X-axis, and the rotation detection kit 2 is used to detect and measure roll between the polarised beam source 6 and receiver 8 about the X-axis. Accordingly, the amount of roll about the X-axis between the machine table 12 and the quill 18 can be determined and used to calibrate the X-axis of the CMM 4. This process can then be repeated to calibrate the Y and Z axes of the CMM 4 by orientating the polarised beam source 6 and receiver 8 accordingly, and moving the quill 18 along the Y and Z axes.

In the embodiment described, the rotation detection kit 2 is mounted on a CMM 4 and is used in the calibration of the CMM 4. However, it will be understood that the rotation detection kit 2 need not necessarily be mounted on a CMM, and could be used in many different applications in which it is useful to detect relative rotation between two components.

Referring now to FIG. 2, there is shown a rotation detection kit configured to measure relative roll between the polarised beam source 6 and the receiver unit 8 about the propagation axis of the beam emitted by the polarised beam source. The polarised beam source 6 comprises first 20 and second 22 laser diodes, first 24 and second 26 lenses, a polarising beam splitter 28, a polarising maintaining fibre optic 30, a collimating lens 31, a non-polarising beam splitter 32, a first polariser 34, a servo photo-diode 36, a servo unit 38 and a timer unit 40. All of these components of the polarised beam source 6 are fixed relative to each other.

The first laser diode 20 is configured to emit a first laser beam having a first linear polarisation state and the second laser diode 22 is configured to emit a second laser beam having a second linear polarisation state. As will be understood, the preferred power of the laser beams emitted by the first 20 and second 22 laser diodes will depend on a number of factors, such as the environment in which the rotation detection kit 2 is used. In preferred embodiments the power of the first 20 and second 22 laser beams are less than 1 milliwatt for safety reasons.

The first 20 and second 22 laser diodes are configured such that when their respective laser beams reach the polarising maintaining fibre optic 30 their polarisation states are orthogonal to each other. The first 20 and second 22 laser diodes are laser diodes that are capable of being modulated at a rate of 1 MHz.

The first 24 and second 26 lenses are configured to focus the laser beams emitted by the first 20 and second 22 laser diodes onto the polarising maintaining fibre optic 30. The polarising beam splitter 28 is configured to direct the first and second laser beams emitted by the first 20 and second 22 laser diodes into the polarising maintaining fibre optic 30.

The polarising maintaining fibre optic 30 is a singlemode fibre optic that has two polarisation axes. The polarising maintaining fibre optic 30 is configured so that one of its polarisation axes is aligned with the first polarisation state of the first laser beam and so that the other of its polarisation axes is aligned with the second polarisation state of the second laser beam. Accordingly, the polarisation states of first and second laser beams emitted by the first 20 and second 22 laser diodes are maintained as they progress through and emerge from the polarisation maintaining fibre optic 30. The polarising maintaining fibre optic 30 is insulated from vibration, mechanical deformation and thermal changes so as to reduce the influence of external factors on the laser beams it carries.

The non-polarising beam splitter 32 is configured to split a laser beam emerging from the polarising maintaining fibre optic 30 into a servo laser beam which is directed toward the first polariser 34 and an identical receiver laser beam which is directed toward the receiver unit 8.

The first polariser 34 is configured so that its polarisation axis is at a 45 degree angle to both the first and second polarisation states of the servo laser beam.

The servo photo-diode 36 is configured to detect the intensity of light passing through the first polariser 34 and to output the detected intensity to the servo unit 38. The servo unit 38 is configured to control the power of the first 20 and second 22 laser diodes as described in more detail below.

The receiver unit 8 comprises a second polariser 42, a detector unit 44 comprising a receiver photo-diode 46, and a roll determinator unit 48. As will be understood, the second polariser 42 need not be part of the detector unit 44. For instance, the second polariser 42 could be mounted on the quill 18 and the receiver unit 8 could be mounted to another part of the CMM 4.

As will be understood, for layout purposes, reflectors and/or other beam steerers can be used to control the path of light through the receiver. For instance, light entering the receiver could be reflected through 90° before passing through the second polariser 42. However, in the embodiment described, the path of light is not altered but passes straight to the second polariser 42. The second polariser 42 is identical to the first polariser 34. The second polariser 42 is mounted within the receiver unit 8 such that when the receiver unit 8 and the polarised beam source 6 are aligned (i.e. so that there is no roll, pitch or yaw between them) the polarisation axis of the second polariser 42 is at a 45 degree angle to both the first and second linear polarisation states of the receiver laser beam.

The receiver photo-diode 46 is identical to the servo photo-diode 36 and is configured to detect the intensity of all light passing through the second polariser 42 and to output the detected intensity to the roll determinator 48. The roll determinator 48 is configured to analyse the detected intensity over a period of time and to provide an output indicative of the amount of roll between the polarised beam source 6 and the receiver unit 8 about the X-axis, as described in more detail below.

The receiver unit 8 is connected to a computer 80 by a communications link 82. In the embodiment described, the communications link is a wireless communications link which utilises the Bluetooth protocol. The computer 80 has a display (not shown) via which a reading indicating the degree of roll between the polarised beam source 6 and the receiver unit 8 can be provided to a user.

In use, the servo unit 38 receives a clock signal from the timing unit 40. The servo unit 38 uses the clock signal to alternately power the first 20 and second 22 laser diodes so that they alternately and mutually exclusively emit first 100 and second 102 laser beams at a predetermined frequency. In the embodiment described, the first 20 and second 22 laser diodes are controlled so that the first and second laser beams alternately occur at a frequency of 10 kHz. However, it will be understood that any suitable frequency could be used and will depend on factors such as the components used, environment in which the rotation detection kit is used and the requirements of the rotation detection kit.

The servo unit 38 controls the first 20 and second 22 laser diodes such that there is no time gap between the emission of the first 100 and second 102 laser beams, but so that there is a 2 µS gap between the emission of the second laser beam and the first laser beam. Accordingly, there is a gap between each cycle of first 100 and second 102 laser beams. This gap is used to synchronise the roll determinator 48 with the cycle of the laser beams as explained in more detail below.

The first 100 and second 102 laser beams emitted from the first 20 and second 22 laser diodes are focussed by the first 24 and second 26 lenses respectively onto the polarising maintaining fibre optic 30, via the polarising beam splitter 28. The combination of the first 24 and second 26 lenses, and the polarising beam splitter 28 helps to ensure that substantially all of the light emitted from the first 20 and second 22 laser diodes is directed into the polarising maintaining fibre optic 30.

The purpose of the polarising maintaining fibre optic 30 is to co-align the paths of the first 100 and second 102 laser beams. What emerges from the polarisation maintaining fibre optic 30 is effectively a resultant laser beam 104 having alternating discrete first and second portions, wherein the first portion corresponds to a first laser beam 100 emitted by the first laser diode 20 and the second portion corresponds to a second laser beam 102 emitted by the second laser diode 22. Accordingly, the polarisation state of the resultant laser beam 104 alternates between two orthogonal polarisation states 10,000 times a second.

The resultant laser beam 104 emerging from the polarisation maintaining fibre optic 30 is collimated by the collimating lens 31 and is then split into identical servo 106 and detector 108 laser beams by the beam splitter 32.

The first and second portions of the servo laser beam 106 that pass through the first polariser 34 are detected by the servo photo-diode 36, the output of which is fed to the servo unit 38. In response to the detected intensities, the servo unit 38 controls the power of the first 20 and second 22 laser diodes to ensure that the intensity of the first and second portions falling on the servo photo-diode is constant. This helps to compensate for any rotation of the polarisation states of the first 100 and second 102 laser beams caused by factors internal to the polarised beam source 6. Accordingly, this helps to ensure that the receiver photo-diode 46 and roll determinator unit 48 does not output a signal indicative of roll due to such rotation of the polarisation states within the polarised beam source 6.

As the first and second portions of the receiver laser beam 108 pass through the second polariser 42, they are resolved into two orthogonal vector components, one of which is parallel to the polarisation axis of the second polariser 42 ("the parallel component"), and the other of which is perpendicular to the polarisation axis. In the described embodiment, the parallel components of each of the first and second portions of the receiver laser beam 108 pass through the second polariser 42 and their intensities are detected by the receiver photo-diode 46. The receiver photo-diode 46 outputs a signal 60 which is indicative of the detected intensities. The output signal 60 of the receiver photo-diode 46 is fed to the roll determinator 48 which analyses the detected intensities and outputs a signal indicative of the extent of roll between the polarised beam source 6 and the receiver unit 8.

The embodiment described is configured such that when the polarised beam source 6 and the receiver unit 8 are aligned, the intensity of the parallel components of each of the first and second portions of the receiver laser beam 108 received at the receiver photo-diode 46 will be the same. In contrast, when the polarised beam source 6 and the receiver unit 8 are not aligned, the magnitude of the parallel component of one of the first and second portions of the receiver laser beam 108 reaching the receiver photo-diode detector 46 will be greater than the other. This is because, when there is a degree of roll between the polarised beam source 6 and the receiver unit 8, the transmission axis of the second polariser 42 will no longer be 45 degrees to the polarisation states of the first and second portions. The parallel component of the portion of the receiver laser beam 108 which has a smaller angle between its polarisation state and the polarisation axis will be larger than that of the other portion of the laser beam. Accordingly, the detected intensity of one of the first and second portions of the receiver laser beam detected by the receiver photo-diode detector 46 will be greater than the other.

Accordingly, the difference in the detected intensity of the first portion of the receiver laser beam 108 and the detected intensity of the second portion of the receiver laser beam 108 is proportional to the degree of roll between the polarised beam source 6 and the receiver unit 8. It is therefore possible for the roll determinator 48 to determine the degree of roll based on that difference.

Furthermore, as the polarised beam source 6 and receiver unit 8 move along their trajectory, any rotation between them will cause a change in the detected intensities of the first and second portions of the receiver laser beam 108. Accordingly, roll between the polarised beam source 6 and the receiver unit 8 can be actively determined during movement along a trajectory by monitoring for changes in the detected intensities.

As shown in more detail in FIG. 3, the roll determinator 48 comprises a pulse detect unit 50, a timing generation unit 52, a sample and hold unit 54 and a synchronous demodulator 56.

The output of the receiver photo-diode 46 is dependent on the intensity of light falling on it. An illustrative example of the output 60 of the receiver photo-diode 46 over a plurality of cycles of the emission of first 100 and second 102 laser beams is shown in FIG. 4*a*. The "a" sections correspond to the detected intensity of the first portions of the receiver laser beam 108, and the "b" sections correspond to the detected intensity of the second portions of the receiver laser beam 108. The troughs 62 represent the gap between the emission of the second laser beam by the second photo diode 22 and the first laser beam by the first photo diode 20. The peaks 64 represent the spikes in the intensity of the first 100 and second 102 laser beams which are caused by the turning on of the first 20 and second 22 laser diodes.

In this example, the polarised beam source 6 and the receiver unit 8 are misaligned by a constant angle over the duration illustrated with reference to FIG. 4. Accordingly, the receiver photo-diode 46 output is consistently higher for the first portions of the resultant laser beam 108 than the second portions. As will be understood, if the polarised beam source 6 and receiver unit 8 were rotating relative to each other, away from their aligned position, then the receiver photo-diode 46 output would be increasingly greater for one of the portions of the resultant laser beam 108 than the other.

The output of the receiver photo-diode 46 is fed into the pulse detect unit 50 which is triggered by a significant drop in the intensity of light detected by the receiver photo-diode 46. In the embodiment described, the pulse detect unit 50 is triggered by the gap between the emission of the second 102 and first 100 laser beams. The output of the pulse detect unit 50, which is passed to the timing generation unit 52, is shown in FIG. 4(*b*). The timing generation unit 52 uses the detection of the troughs 62 to calculate when the spikes 64 will occur. The timing generation unit 52 then generates a sample and hold signal 68 which is provided to the sample and hold unit 54. The timing generation unit 52 also generates a demodulator timing signal 69 which is provided to the synchronous demodulator unit 56 as described in more detail below. As shown in FIG. 4(*c*), the sample and hold signal 68 is set to hold during the troughs 62 and spikes 64.

The output 60 of the receiver photo-diode 46 is also fed into the sample and hold unit 54 which samples the output in accordance with the sample and hold signal 68 so that the troughs 62 and the spikes 64 of the receiver photo-diode output 60 are not sampled. Accordingly, as shown in FIG. 4(*d*), the output 70 of the sample and hold unit 54 is purely representative of the intensities of the first and second portions of the receiver laser beam 108.

The output 70 of the sample and hold unit 54 is fed into the synchronous demodulator 56 which, using the timing signal 69, outputs a signal 72 indicative of the difference in the intensity of the first and second portions of the receiver laser beam as shown in FIG. 4(*f*). As will be understood, the greater the degree of roll between the polarised beam source 6 and the receiver unit the greater the signal output by the synchronous demodulator.

In order for the synchronous demodulator unit 56 to be able to analyse the output 70 from the sample and hold unit 54 so as to output a signal indicative of the difference in the intensities of the first and second portions of the receiver laser beam 108, it is necessary for the synchronous demodulator unit 56 to know where to look for the step in detected intensity. Accordingly, the timing generation unit 52 uses the triggering of the pulse detection unit 50 to generate a demodulator timing signal 69 (shown in FIG. 4(*e*)) which is fed to the synchronous demodulator unit 56.

The synchronous demodulator unit 56 uses the demodulator timing signal 69 to synchronise itself with the cycle of the first and second portions of the receiver laser beam 108. It therefore knows when it might expect to see a change in the detected intensity due to roll and so enables it to find such a change even if the sample and hold output 70 is noisy and not smooth as shown in FIG. 4(*d*). As shown in FIG. 4(*f*) the synchronous demodulator unit 56 provides an output signal 72 which is proportional to the difference in the detected intensities of the first and second portions of the receiver laser beam 108.

The output signal 72 from the synchronous demodulator unit 56 is sent to the computer 80 via the communications link 82. On the basis of the output signal 72, the computer 80 outputs a reading which indicates the degree of roll between the polarised beam source 6 and the receiver unit 8. Due to environmental reasons, such as for example the distance between the polarised beam source 6 and receiver 8, the intensity of the beams may vary, for example due to attenuation. This can be compensated for by using a measurement of the average beam intensity and an ambient measurement taken during the gap between the emission of the second 102 and first 100 laser beams.

As will be understood, if there is no roll between the polarised beam source 6 and the receiver unit 8, then the amplitudes of sections "a" and sections "b" of the photodiode output will be equal, the output of the sample and hold unit 54 will be constant, and accordingly the synchronous demodulator unit 56 output signal 72 will be set at a level which is interpreted by the computer 80 as meaning that there is no roll.

Due to the first and second portions of the receiver laser beam 108 being detected by the same receiver photo-diode 46, any fluctuations in the condition of the receiver photo-diode 46 will affect both of the portions in the same way and to the same extent.

Furthermore, as the first and second portions of the receiver laser beam 108 have taken the same path to reach the receiver photo-diode 46, any dust, dirt or other contamination in the path will affect both of the same in the same way and to the same extent.

Accordingly, the difference in the detected intensity of each of the first and second portions of the receiver laser beam 108 will not change as a result of any such fluctuations in the conditions of the receiver photo-diode 46 or contamination in the path of the receiver laser beam 108. The synchronous demodulator unit 56 output will therefore not change as a result of such fluctuations or contamination. Accordingly, receiver unit 8 is insensitive to changes in the condition of the receiver photo-diode 46 and/or the environment in which the rotation detection kit 2 is used, and so provides a reliable indication of roll.

For the embodiment described above to work, the rotation detection kit 2 must be setup so that when the transmitter 6 and receiver 8 are aligned, the intensity of each of the first and second portions of the receiver laser beam 108 detected by the receiver photo-diode 46 are equal. Accordingly, if (once the transmitter 6 and receiver 8 have been placed on their respective parts of the CMM 4 and are aligned) the detected intensity of each of the first and second portions of the receiver laser beam 108 are not the same, the rotation detection kit 2 needs to be setup so that the detected intensities are the same before the operation described above is performed.

The servo unit 38 can have an input mechanism by which the intensity of each of the laser beams emitted by the first 20 and second 22 laser diodes can be adjusted. In the embodiment described, the servo 38 receives from the receiver unit 8 via a wireless communications link (not shown) a signal which indicates the detected intensity of each of the first and second portions of the receiver laser beam 108. The servo unit 38 then automatically adjusts the power of the laser beams emitted by the first 20 and/or second 22 laser beams until the intensity of each of the first and second portions of the receiver laser beam 108 detected by the receiver photo-diode 46 are the same. Accordingly, when this is the case, the actual intensity of the first 100 and second 102 laser beams will likely differ, and that difference will be detected by the servo photo-diode 36. In operation, the servo 38 will therefore be configured so as to maintain that difference in the intensity of the first and second portions of the servo laser beam 106 as detected by the servo photo-diode 36.

Referring now to FIG. 5, an alternative embodiment of a rotation detection kit according to the present invention is described. This embodiment is very similar to that described above in connection with FIGS. 1 to 4 above and like parts share like reference numerals. However, in this embodiment the polarised beam source 302 comprises the detector unit 44, and the second polariser 42 is provided within a reflector unit 304 which also comprises a retroreflector 306. In this case, the reflector unit 304 is mounted onto the moveable quill 18 via mountings (not shown), and the polarised beam source 302 and reflector unit 304 are arranged such that the beam 108 from the polarised beam source 302 passes through the second polariser 42 before being reflected back onto the receiver photodiode 46 by the retroreflector 306. This has the advantage that electrical power need be provided at one end of the system only. This arrangement is particularly useful in situations in which the kit is to be used part of a tracking system—the reflector unit 304 can mounted to the component to be tracked and used as a target. The combined polarised beam source/receiver unit 302 can be mounted on an actuator which causes the polarised beam source 302 to follow the reflector unit 304 on the basis of the output of the roll determinator 48. Furthermore, instead of or in addition to modulating the first 20 and second 22 laser diodes such that there is a gap between the second and first beam portions, a timing signal for use in synchronously demodulating the output of the receiver photodiode 46 could be provided to the roll determinator 48 directly from the timing unit 40 along line 308.

FIG. 6a illustrates another embodiment of a displacement detection kit 400 according to the invention which is similar to that described above in connection with FIGS. 1 to 4, and like parts share like reference numerals. However, in this embodiment, the first laser diode 20 emits a red beam and the second laser diode 22 emits a blue beam. (As will be understood, the use of a red and a blue beam is not essential—what is important is that the first and second beams are of different wavelengths). Accordingly, the beam 108 emitted from the polarised beam source 402 will comprise alternating first red beam portions and second blue beam portions. Furthermore, the receiver unit 404 comprises a quad-cell photodiode 406, an X/Y position determination unit 408 and a demodulation and extrapolation unit 410. The outputs from the quad-cell photodiode 406 are summed and passed to the roll determinator 48 which calculates a value indicative of roll in accordance with the above described method based on the overall intensity detected by all of the cells in the quad-cell photodiode 406.

As the first and second beam portions are of different wavelengths, they will be diffracted by different extents as they propagate between the polarised beam source 402 and receiver 404. Accordingly, the beam portions will fall on the quad-cell photodiode 406 at slightly different points, for instance the centre points of the beam portions will fall at slightly different points. However, as will be understood, the difference in the amount by which the first and second beam portions are diffracted will be small and so the beam portions will still at least partially overlap on quad-cell photodiode 406. Nevertheless, the intensity values for each of the cells in the quad-cell photodiode 406 are analysed by the x/y position determination unit in order to obtain a two dimensional coordinate value for the centre point of each of the first and second beam portions falling on the quad-cell photodiode 406. This information is then passed to the demodulation and extrapolation unit 410 which time demodulates the data to obtain the x/y data for the first beam portions and the x/y data for the second beam portions. Once demodulated, the demodulation and extrapolation unit 410 then uses the x/y data obtained for the different wavelengths to obtain an extrapolated x/y position which is representative of the position the beam portions would have fallen on the quad-cell photodiode 406 if it weren't for the effect of diffraction. Accordingly, a more true lateral alignment measurement is obtained.

In a slightly different embodiment shown in FIG. 6b, the first 20 and second 22 laser diodes are configured in exactly the same manner as that described in connection with FIG. 2, i.e. they both emit beams having the same wavelength. However, the polarised beam source 402 comprises a third laser diode 412, third lens 414 and a second beam splitter 416. The third laser diode 412 is configured to emit a beam having a different wavelength to that emitted the first 20 and second 22 laser diodes. In this embodiment, the first 20 and second 22 laser diodes are configured to emit red beams and the third laser diode 412 is configured to emit a blue beam. In this case, the servo unit 38 can be configured to control the first 20, second 22 and third 412 laser diodes such that they each emit a beam in turn. Accordingly, in this case the beam 108 emitted from the polarised beam source will comprise a repeating pattern of a first red beam portion (from the first laser diode 20), a second red beam portion (from the second laser diode 22) and a blue beam portion (from the third laser diode 412). This is advantageous as an accurate relative rotation measurement could be calculated from the first and second red beam portions (which will both take the exact same path between the polarised beam source 402 and receiver unit 404 and fall on the same part of the photodiode 406) using the method described above in connection with FIG. 2. Furthermore, a more true lateral alignment measurement could be obtained from the blue beam portion and at least one of the first and second red beam portions using the method described above in connection with FIG. 6a.

Referring now to FIG. 7, a further alternative embodiment of a rotation detection kit according to the present invention is described. The rotation detection kit comprises a polarised beam source 200 and a receiver unit 210. The polarised beam source 200 and the receiver unit 210 are rotatable relative to each other about the X-axis.

In this embodiment, the polarised beam source 200 comprises single laser diode 202, a servo unit 204 and a polariser 208.

The receiver unit 210 comprises an electro-optic crystal 250, an electro-optic crystal controller 254, a polariser 252 and a photodiode 220. The electro-optic crystal 250 is configured such that when no voltage is applied to it the laser beam 206 is able to pass straight through the electro-optic crystal 250 with its polarisation state unaffected, and when a voltage is applied to it via the electro-optic crystal controller 254, the polarisation state of the laser beam 206 is rotated through 90 degrees. The electro-optic crystal controller 254 is configured to control the electro-optic crystal 250 such the polarisation state of the laser beam 206 leaving the electro-optic crystal 250 continuously switches between two orthogonal polarisation states. The polariser 252 is configured such that when the rotation detection kit is initially set up, the polarisation axis of the polariser is at 45 degrees to the both of the polarisation states of the laser beam 206 emerging from the electro-optic crystal 250. Accordingly, the receiver photodiode 220 alternately detects the component of the two orthogonal polarisations states resolved by the polariser 252, the intensity of which depends on the relative rotational orientation of the transmitter unit 200 and the receiver unit 210.

As illustrated in FIG. 8, the roll determinator 222 comprises a timing generation unit 232, a sample and hold unit 234 and a synchronous demodulator 236. The timing generation unit 232 receives a signal from the electro-optic control unit 254 which indicates the frequency by which the polarisation state of the laser beam 206 is flipped between the orthogonal polarisation states. As will be understood, the roll determinator 222 operates in a manner similar to that discussed above in connection with FIG. 2 in order to provide a signal to a computer 242 which is indicative of the relative rotation between the polarised beam source 200 and the receiver unit 210.

In a further alternative embodiment as shown in FIG. 9, the electro-optic crystal 250 and electro-optic crystal controller 254 could be located in the polarised beam source 270 so as to modulate the beam emitted by the laser diode 202 before it leaves the polarised beam source 270. Accordingly, in this embodiment, the laser beam 276 will comprise a plurality of first and second temporally spaced beam portions having orthogonal, substantially linear polarisation states. The electro-optic crystal controller 254 could provide the timing signal to the timing generation unit 232 in any suitable way, for instance, by sending it wirelessly.

In a yet further embodiment of the invention, an electro-optic crystal 250 could be provided in the polarised beam source 270, and configured to oscillate the polarisation orientation of the laser beam 206 leaving the polarised beam source 200 back and forth through a predetermined angle, for instance 90°. This can be achieved by smoothly varying the voltage applied to the opto-electric crystal, rather than supplying one of two voltage levels. Accordingly, in this case the first and second beam portions are defined by the direction of rotation of the polarisation orientation rather than the substantially fixed orientation of the polarisation of the beam. That is, clockwise rotation of the polarisation orientation defines the first beam portion and anti-clockwise rotation of the polarisation orientation defines the second beam portion, or vice versa. The intensity of each beam portion as detected by the photodiode 220 will vary over time. In the particular embodiment described, the roll detector is initially setup such that polarisation axis of the polariser device 252 is set at 45° to the beginning and end polarisation orientation of the beam portions. Accordingly, whilst there is no roll between the polarised beam source 270 and the receiver 280 the intensity received at the photodiode 220 will over a given period of time look like that as illustrated in FIG. 10a. When there is a degree of roll between the polarised beam source 270 and the receiver 280 the intensity received at the photodiode 220 will over a given period of time look like that as illustrated in FIG. 10b. As can be seen, the sections identified by "a" correspond to first beam portions and the sections identified by "b" correspond to second beam portions. As will be understood, in this case, the sections can be compared in order to obtain a value indicative of roll, for instance by comparing the intensity detected at the borders of the first and second beam portions.

The above described embodiments all describe systems which measure relative roll between a beam source and a polariser device, that is rotation about an axis that extends parallel to the propagation axis of the beam emitted from the beam source. However, the invention can also be used to improve measurement of relative rotation about axes that extend non-parallel to the propagation axis of the beam emitted form the beam source. For instance, the invention can also be used to measure rotation about a first axis that extends perpendicular to the propagation axis of the beam emitted from the beam source, hereinafter referred to as pitch. The invention can also be used to measure rotation about a second axis that extends perpendicular to the propagation axis of the beam emitted from the beam source and perpendicular to the first axis, hereinafter referred to as yaw. With reference to the Figures, in the embodiment described, roll is rotation about the X-axis, pitch can be rotation about the Y-axis and yaw can be rotation about the Z-axis. As will be understood, pitch could equally be considered as rotation about the Y-axis and yaw could be rotation about the Z-axis.

Such a system is shown in FIG. 11 which is substantially identical to that shown in FIG. 2 and like parts share like reference numerals. However, in this case, the receiver unit 8 comprises second 441, third 442 and fourth 443 polarisers, corresponding second 444, third 445 and fourth 446 photodiodes, and corresponding a roll 447, pitch/roll 448 and yaw/roll 449 determinator units. Second 450 and third 452 beam-splitters and reflector 454 are provided such that identical copies of the beam coming into the receiver unit 8 are passed through the second 441, third 442 and fourth 443 polarisers and subsequently onto their corresponding second 444, third 445 and fourth 446 photo-diodes.

The second 441, third 442 and fourth 443 polarisers are identical to the first polariser 34. In the particular embodiment described, the second 441, third 442 and fourth 443 polarisers are mounted within the receiver unit 8 such that when the receiver unit 8 and the polarised beam source 6 are initially aligned (i.e. so that there is no roll, pitch or yaw between them) the intensities of the first and second beam portions as detected by their respective photodiode are identical.

As schematically illustrated in FIG. 11, the second 441, third 442 and fourth 443 polarisers are each arranged differently relative to the beam coming into the receiver unit 8. In particular, the second polariser 441 is arranged such that the relative roll (i.e. rotation about the X-axis) between the polarised beam source 6 and receiver unit 8 causes a change in the relative intensities of the beam portions falling on the second photodiode 444; the third polariser 442 is arranged such that relative pitching (i.e. rotation about the Y-axis) between the polarised beam source 6 and receiver unit 8 causes a change in the relative intensities of the portions beam falling on the third photodiode 445; and the fourth polariser 443 is arranged such that relative yawing (i.e. rotation about the Z-axis) between the polarised beam source 6 and receiver unit 8 causes a change in the intensities of the beam portions falling on the fourth photodiode 446. It will be understood, that rolling will also affect the relative intensities of the beam portions falling on the third 445 and fourth 446 photodiodes.

As shown in more detail in FIGS. 12(*a*) to (*c*), the second polariser's 441 polarisation axis is arranged such that it is normal to the propagation axis of the beam received by the receiver unit 8. In this case, rotation about the "Roll" axis causes a change in the polarising effect it has on the beam. The third polariser 442 is arranged such that its polarisation axis is yawed relative to that of the second polariser device 441. In this case, rotation about the "Pitch" axis causes a change in the polarising effect it has on the beam. The fourth polariser 443 is arranged such that its polarisation axis is pitched relative to that of the second polariser device 441. In this case, rotation about the "Yaw" axis causes a change in the polarising effect it has on the beam. As will be understood, the third 442 and fourth 445 polarisers also cause a change in the polarising effect they have on the beam as they are rotated about the "Roll" axis, and accordingly, they are actually providing a measure of rotation about an axis that is between the roll axis and pitch/yaw axes respectively, as illustrated by Φ in the drawings.

Referring back to FIG. 11, the roll 447, pitch/roll 448 and yaw/roll 449 determinators work in the same manner as described above in connection with FIGS. 2 to 4 in that they measure the difference in the intensities of the beam portions falling on their respective photodiodes. Accordingly, the roll 447, pitch/roll 448 and yaw/roll 449 determinator units are configured to analyse the intensities detected by the second 444, third 445 and fourth 446 photodiodes over a period of time and provide an output indicative of the amount of roll, pitch and roll, and yaw and roll respectively between the polarised beam source 6 and the receiver unit 8. As the computer 51 already knows from the roll determinator's 4 output how much roll there is between the polarised beam source 6 and receiver unit 8, the computer can use the pitch and roll determinator's 448 output in combination with the roll determinator's output to work out how much pitch there is between the beam source 6 and the receiver unit 8. Furthermore, the computer can use the yaw and roll determinator's 449 output in combination with the roll determinator's output to work out how much yaw there is between the beam source 6 and the receiver unit 8.

The rotation detection kits described enable roll, pitch and/or yaw to be measured to accuracies of approximately less than 5 microradians. However, as will be understood, the invention is not limit to such accurate system and could for instance be used in systems having an accuracy which is 5 microradians or more.

The invention claimed is:

1. A rotation detection kit, comprising:
a beam source;
a receiver comprising at least one beam intensity sensor;
a polariser device for location in the path of a beam emitted from the beam source and received by the beam sensor;
a modulator configured to modulate at least one of i) the beam source and ii) a beam emitted by the beam source to create a discretely varying polarisation orientation thereby defining a first and at least a second temporally spaced beam portions which are incident on the polariser device and the beam sensor, and
a beam conditioner for conditioning the first and the at least second temporally spaced beam portions such that the first and the at least second temporally spaced beam portions have substantially identical profiles and at least an initial common propagation axis toward the polariser device.

2. The rotation detection kit as claimed in claim 1, comprising a first beam sensor for detecting the intensity of each of the first and the at least second temporally spaced beam portions.

3. The rotation detection kit as claimed in claim 2, in which a footprint of each of the first and the at least second temporally spaced beam portions on the first beam sensor at least partially overlap.

4. The rotation detection kit as claimed in claim 1, in which the first and the at least second temporally spaced beam portions have substantially the same wavelength.

5. The rotation detection kit as claimed in claim 1, in which the beam source comprises a first emitter for emitting the first temporally spaced beam portion and at least a second emitter for emitting the at least second temporally spaced beam portion.

6. The rotation detection kit as claimed in claim 5, in which the beam source comprises the beam conditioner, wherein the first and the at least second temporally spaced beam portions pass through the beam conditioner before being emitted from the beam source.

7. The rotation detection kit as claimed in claim 1, in which the beam conditioner comprises a fibre optic.

8. A rotation detection kit as claimed in claim 1, further comprising:
a splitter for directing each of the first and the at least second temporally spaced beam portions towards both the polariser device and towards a second polariser; and
at least a second beam sensor for detecting the intensity of one of each of the first and the at least second temporally spaced beam portions subsequent to the second polariser device.

9. The rotation detection kit as claimed in claim 8, in which:
the modulator is configured to servo the first and the at least second temporally spaced beam portions such that the intensities detected by the second beam sensor are constant; and
the receiver is configured to output a signal indicative of rotation.

10. The rotation detection kit as claimed in claim 9, in which the modulator is configured to servo the first and the at least second temporally spaced beam portions by modulating the intensities of the first and second beams emitted.

11. The rotation detection kit as claimed in claim 9, further comprising a polarisation controller positioned in the path of the first and second beams and in which the modulator is configured to servo the first and the at least second temporally spaced beam portions via the polarisation controller.

12. The rotation detection kit as claimed in claim 1, configured such that the intensities of the first and the at least second temporally spaced beam portions as detected by the at least one beam intensity sensor is dependent on rotation about an axis that extends parallel to the propagation axis of the beam emitted from the beam source.

13. The rotation detection kit as claimed in claim 1, in which the modulator is configured to transmit a synchronisation signal to the receiver, which can be used to synchronise the receiver with the creation of the first and the at least second temporally spaced beam portions.

14. The rotation detection kit as claimed in 13, in which the synchronisation signal is detected by the at least one beam intensity sensor.

15. The rotation detection kit as claimed in claim 14, in which the synchronisation signal comprises a pulse between the first and the at least second temporally spaced beam portions.

16. The rotation detection kit as claimed in claim 1, in which the receiver synchronously demodulates the first and the at least second temporally spaced beam portions.

17. The rotation detection kit as claimed in claim 1, in which the first and the at least second temporally spaced beam portions are optical beam portions.

18. The rotation detection kit as claimed in claim 1, in which a output of the receiver is dependent on the extent of the rotation based on the detected intensities.

19. The rotation detection kit as claimed in claim 1, in which the first polarisation state is substantially orthogonal to the second linear polarisation state.

20. The rotation detection kit as claimed in claim 1, in which the beam source comprises a beam combiner for combining the paths of the first and the at least second temporally spaced beam portions.

21. The rotation detection kit as claimed in claim 1, in which the beam conditioner comprises a waveguide.

22. The rotation detection kit as claimed in claim 1, in which the receiver is configured to provide an output based on the position of the first and the at least second temporally spaced beam portions on the at least one beam intensity sensor.

23. The rotation detection kit as claimed in claim 1, in which the first and the at least second temporally spaced beam portions have different wavelengths.

24. The rotation detection kit as claimed in claim 23, in which the receiver is configured to provide an output indicative of the lateral position of the beam portions having different wavelengths on the at least one beam intensity sensor.

25. The rotation detection kit as claimed in claim 23, configured to obtain an extrapolated lateral alignment value of the beam source relative to another component of the rotation detection kit, from the position of the first and the at least second temporally spaced beam portions on the at least one beam intensity sensor.

26. A rotation detection kit, comprising:
a polarised beam source;
a receiver comprising at least one beam intensity sensor;
a polariser device for location in a path of a beam emitted from the polarised beam source and received by the at least one beam intensity sensor, the polariser device being rotatable relative to the polarised beam source; and
a modulator configured to modulate at least one of i) the polarised beam source and ii) a polarised beam emitted by the polarised beam source to create a discretely varying polarisation orientation thereby defining a first and at least a second temporally spaced beam portions which are resolved by the polariser device and fall on the beam intensity sensor sequentially, and
a beam conditioner for conditioning the first and the at least second temporally spaced beam portions such that the first and the at least second temporally spaced beam portions have substantially identical profiles and at least an initial common propagation axis toward the polariser device;
the receiver being configured to provide an output based on the intensities of the first and the at least second temporally spaced beam portions detected by the at least one beam intensity sensor.

27. A rotation detection kit, comprising:
a beam source;
a receiver comprising a beam sensor;
a polariser device for location between the beam source and the beam sensor;
a modulator configured to modulate the beam source to create a discretely varying polarisation orientation thereby defining a first and at least a second temporally spaced beam portions; and
in which the beam source comprises a beam conditioner for conditioning the first and the at least second temporally spaced beam portions before they are emitted toward the receiver such that the first and the at least second temporally spaced beam portions have substantially identical profiles and at least an initial common propagation axis toward the polariser device.

* * * * *